US012447080B2

(12) United States Patent
Linde

(10) Patent No.: US 12,447,080 B2
(45) Date of Patent: Oct. 21, 2025

(54) LIFTING DEVICES POSITIONABLE IN HIGH RANGE POSITIONS AND LOW RANGE POSITIONS

(71) Applicant: Liko Research & Development AB, Luleå (SE)

(72) Inventor: Marcus Linde, Öjebyn (SE)

(73) Assignee: Liko Research & Development AB, Luleå (SE)

( * ) Notice: Subject to any disclaimer, the term of this patent is extended or adjusted under 35 U.S.C. 154(b) by 407 days.

(21) Appl. No.: 18/060,841

(22) Filed: Dec. 1, 2022

(65) Prior Publication Data

US 2023/0100806 A1 Mar. 30, 2023

Related U.S. Application Data

(62) Division of application No. 17/075,810, filed on Oct. 21, 2020, now Pat. No. 11,540,965.

(60) Provisional application No. 62/938,583, filed on Nov. 21, 2019.

(51) Int. Cl.
*A61G 7/10* (2006.01)

(52) U.S. Cl.
CPC ......... *A61G 7/1017* (2013.01); *A61G 7/1046* (2013.01)

(58) Field of Classification Search
CPC ... A61G 7/1017; A61G 7/1046; A61G 7/1061
USPC ............................................................ 5/87.1
See application file for complete search history.

(56) References Cited

U.S. PATENT DOCUMENTS 2,675,209 A 4/1954 Freed
2,846,091 A 8/1958 Heffner
3,263,822 A * 8/1966 Weinman ............... B66C 23/48 212/301
3,877,421 A 4/1975 Brown
5,022,106 A 6/1991 Richards
5,365,621 A 11/1994 Blain
5,367,721 A 11/1994 Boyles
5,375,963 A 12/1994 Wohlwend
(Continued)

FOREIGN PATENT DOCUMENTS

CN 108294890 A 7/2018
DE 4209233 C2 12/1998
(Continued)

OTHER PUBLICATIONS

Extended European Search Report dated Apr. 29, 2021, for EP Patent Application No. 20207435.7, pp. 1-7.

*Primary Examiner* — Justin C Mikowski
*Assistant Examiner* — Luke Hall
(74) *Attorney, Agent, or Firm* — Dinsmore & Shohl LLP

(57) ABSTRACT

Lifting devices for positioning a lift actuator in a high range position and a low range position are disclosed. The lifting devices may include a lift mast, a lift arm pivotally coupled to the lift mast, a lift actuator having a first end and a second end, and a linkage member having a first end and a second end. The first end of the lift actuator is pivotally coupled to the lift mast. The first end of the linkage member is pivotally coupled to the lift arm and the second end of the linkage member is pivotally coupled to the second end of the lift actuator such that the lift actuator includes a high range position relative to the lift arm and a low range position relative to the lift arm.

18 Claims, 11 Drawing Sheets

(56) References Cited

U.S. PATENT DOCUMENTS

| | | | | |
|---|---|---|---|---|
| 5,662,560 | A * | 9/1997 | Svendsen ........... A63B 71/0009 | 482/54 |
| 6,164,625 | A * | 12/2000 | Shockley ................ B66C 23/48 | 254/8 B |
| 6,170,802 | B1 * | 1/2001 | Stovall .................... B66C 23/48 | 254/8 B |
| 6,637,610 | B1 * | 10/2003 | Cheeseboro ......... A61G 7/1042 | 212/327 |
| 7,392,554 | B1 | 7/2008 | Su et al. | |
| 9,283,130 | B2 | 3/2016 | Walker et al. | |
| 9,693,922 | B2 | 7/2017 | Andersson et al. | |
| 10,478,361 | B2 | 11/2019 | Harmeyer et al. | |
| 2003/0000013 | A1 | 1/2003 | Schroeter | |
| 2003/0047724 | A1 | 3/2003 | Landreth et al. | |
| 2004/0232395 | A1 * | 11/2004 | Brooks ................ A61G 7/1011 | 254/8 R |
| 2012/0174314 | A1 | 7/2012 | Clement et al. | |
| 2013/0019401 | A1 | 1/2013 | Faucher et al. | |
| 2018/0271728 | A1 | 9/2018 | Eriksson et al. | |
| 2019/0314234 | A1 | 10/2019 | Andersson et al. | |

FOREIGN PATENT DOCUMENTS

| | | | | |
|---|---|---|---|---|
| EP | 0737465 | A2 | 10/1996 | |
| EP | 0756858 | A1 | 2/1997 | |
| EP | 0865783 | B1 | 4/2002 | |
| EP | 1595519 | B1 | 1/2009 | |
| GB | 1273381 | A | 5/1972 | |
| GB | 2333089 | A | 7/1999 | |
| JP | WO9625906 | A1 * | 8/1996 | ........... A61G 7/1017 |
| WO | 9625906 | A1 | 8/1996 | |
| WO | 0158404 | A1 | 8/2001 | |
| WO | 2005053593 | A1 | 6/2005 | |
| WO | 2007080147 | A1 | 7/2007 | |

* cited by examiner

LIFTING DEVICES POSITIONABLE IN HIGH RANGE POSITIONS AND LOW RANGE POSITIONS

CROSS-REFERENCE TO RELATED APPLICATIONS

This application is a divisional application and claims priority to U.S. Non-Provisional patent application Ser. No. 17/075,810, filed Oct. 21, 2020, for "Lifting Devices Positionable in High Range Positions and Low Range Positions", which claims the benefit of U.S. Provisional Patent Application No. 62/938,583, filed Nov. 21, 2019, for "Lifting Devices Systems Positionable in High Range Positions and Low Range Positions," which are hereby incorporated by reference in their entirety including the drawings.

TECHNICAL FIELD

The present specification generally relates to lifting devices and, more specifically, to lifting devices comprising high range positions and low range positions for adjusting the range of vertical motion and the speed of movement of the lifting devices.

BACKGROUND

Lifting devices, such as patient lifts used in the health care industry, may generally comprise a lift actuator, such as an electric motor or similar actuator, which may be coupled to a mechanical lift arm or a cable lifting system. The lift actuator facilitates actuation of the mechanical lift arm or the cable lifting system thereby raising and/or lowering a load coupled to the lift arm or the cable lifting system. For example, when the lifting device is a patient lift, a sling or other support apparatus may be coupled to the mechanical lift arm or the cable lifting system. A subject may be positioned in the sling and a lift control system coupled to the lift actuator may be used by an operator to activate the lift actuator, which, in turn, raises and/or lowers the subject by actuating the mechanical lift arm or the cable lifting system.

Due to the lift actuator being fixed to the lift arm at a single pivot point, the height to which the lift arm raises and lowers is limited by the degree of extension and retraction of the lift actuator. Lift actuators having a greater range of extension and retraction are more expensive than those with a lesser range as they must be constructed to provide increased stability upon extension. In addition, lift actuators capable of adjusting the speed of extension and retraction contributes to an increased cost of the lift actuator. Thus, lifting devices seeking to reduce costs typically utilize less expensive lift actuators in a lift arm that is restricted to a reduced range of vertical motion and restricted to moving at a single speed during raising and lowering of the lift arm.

Accordingly, a need exists for a lifting device including a lift arm that is positionable between a higher range of vertical motion and capable of adjusting the speed of motion of a lift arm without replacing an existing lift actuator with a more expensive lift actuator.

SUMMARY

In one embodiment, a lifting device for positioning a lift actuator in a high range position and a low range position includes a lift mast, a lift arm pivotally coupled to the lift mast, a lift actuator having a first end and a second end, and a linkage member having a first end and a second end. The first end of the lift actuator is pivotally coupled to the lift mast. The first end of the linkage member is pivotally coupled to the lift arm and the second end of the linkage member is pivotally coupled to the second end of the lift actuator such that the lift actuator includes a high range position relative to the lift arm and a low range position relative to the lift arm. The lift actuator is selectively positionable in the high range position and the low range position.

In another embodiment, a lifting device for positioning a lift actuator in a high range position and a low range position includes a lift mast, a lift arm pivotally coupled to the lift mast and including a cavity extending at least partially along a length of the lift arm, a lift actuator having a first end and a second end, and a carriage at least partially disposed within the cavity. The first end of the lift actuator is pivotally coupled to the lift mast and the second end of the lift actuator is pivotally coupled to the carriage. The carriage is movable within the cavity in a direction of the length of the lift arm and selectively positionable at at least two points along the cavity.

In yet another embodiment, a lift arm assembly for positioning a lift actuator in a high range position and a low range position includes a lift arm pivotally connectable to a lift mast, and a linkage member having a first end and a second end. The first end of the linkage member is pivotally coupled to the lift arm, and the second end of the linkage member is pivotally connectable to the lift actuator such that the lift actuator can be selectively positioned in a high range position relative to the lift arm and a low range position relative to the lift arm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
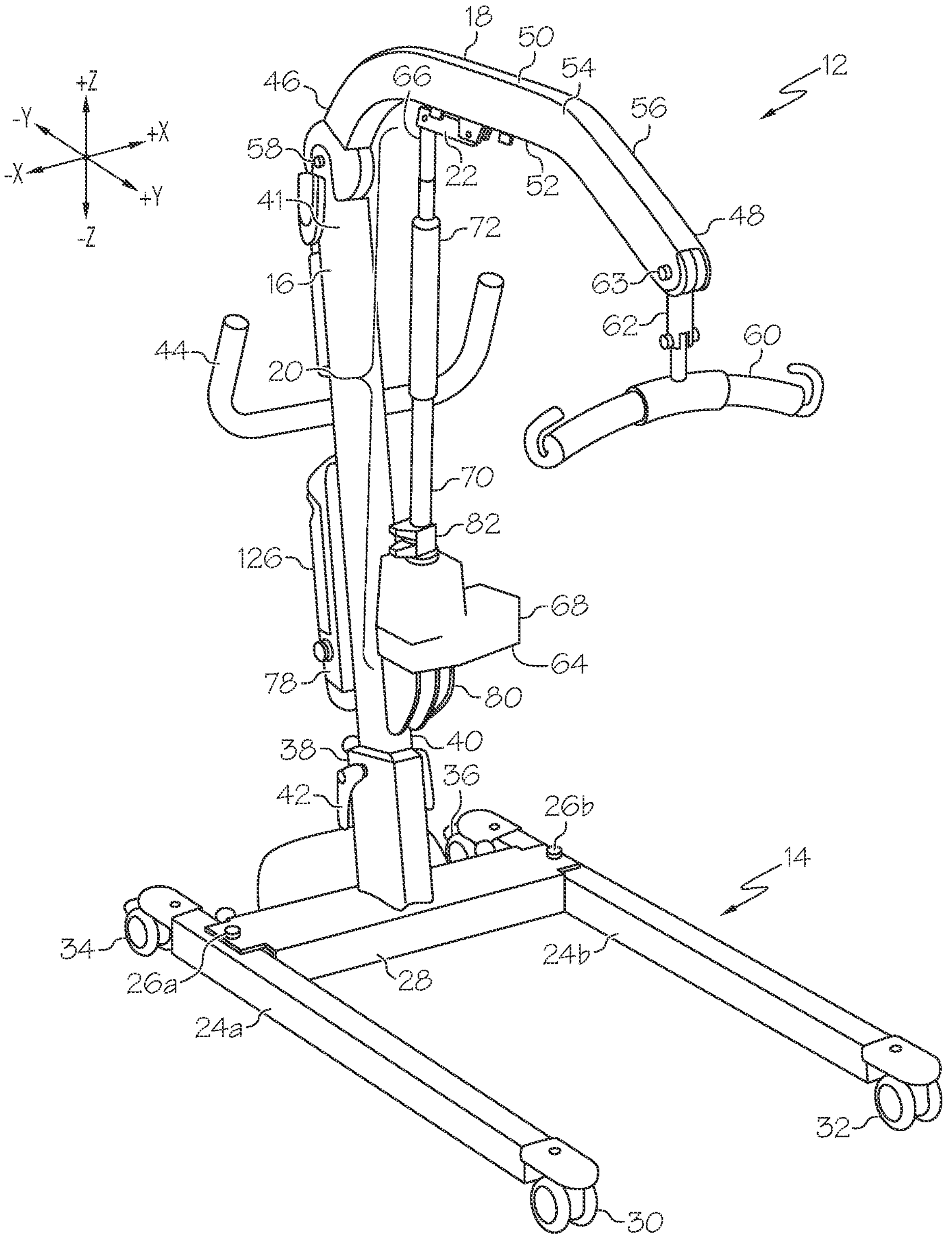
FIG. 1 depicts a front perspective view of an embodiment of a lifting device including a lift arm and a lift actuator in a high range position according to one or more embodiments shown and described herein.
Figure 8:
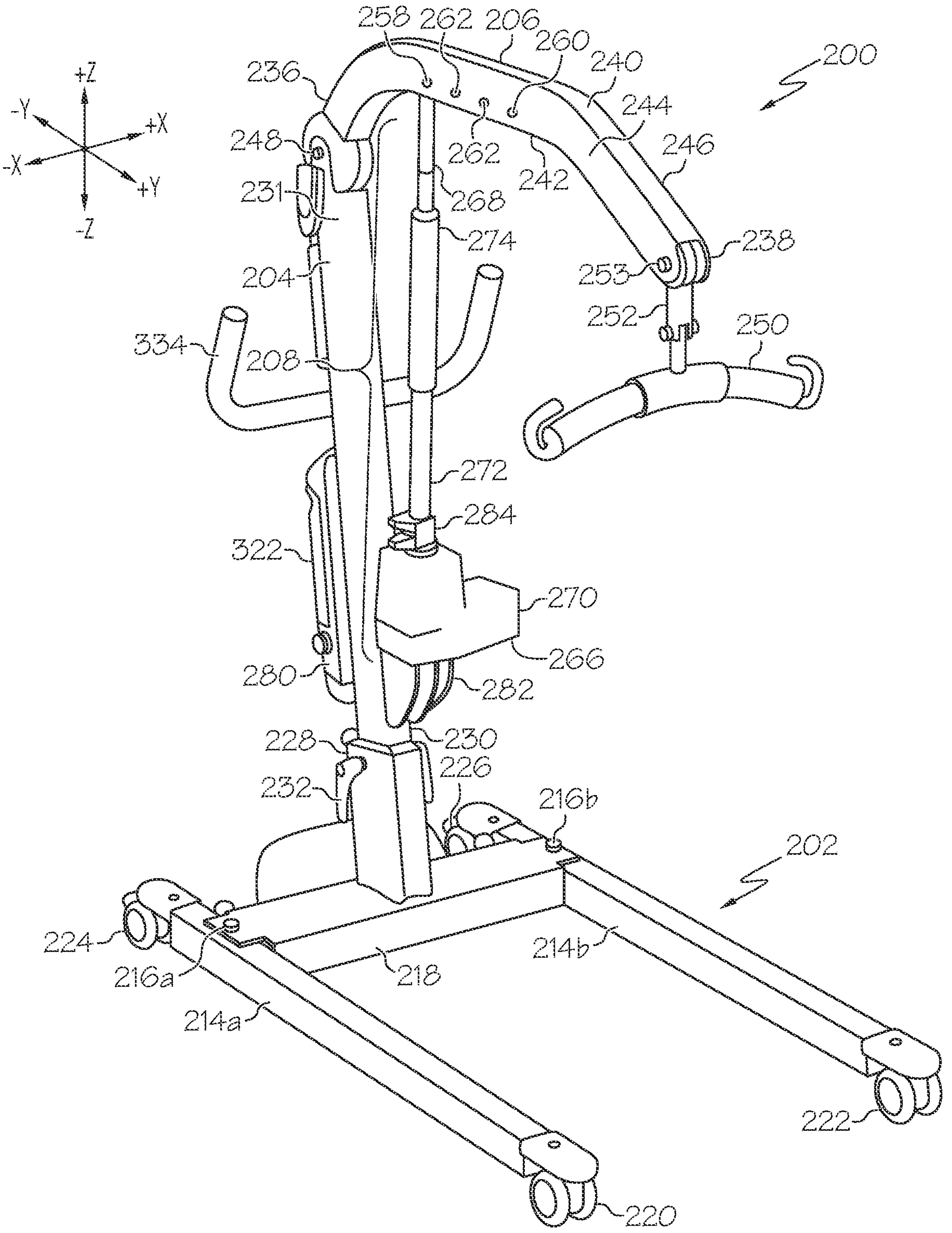
FIG. 8 depicts a front perspective view of an embodiment of a lifting device including a lift arm and a lift actuator in a high range position according to one or more embodiments shown and described herein.
Figure 9:
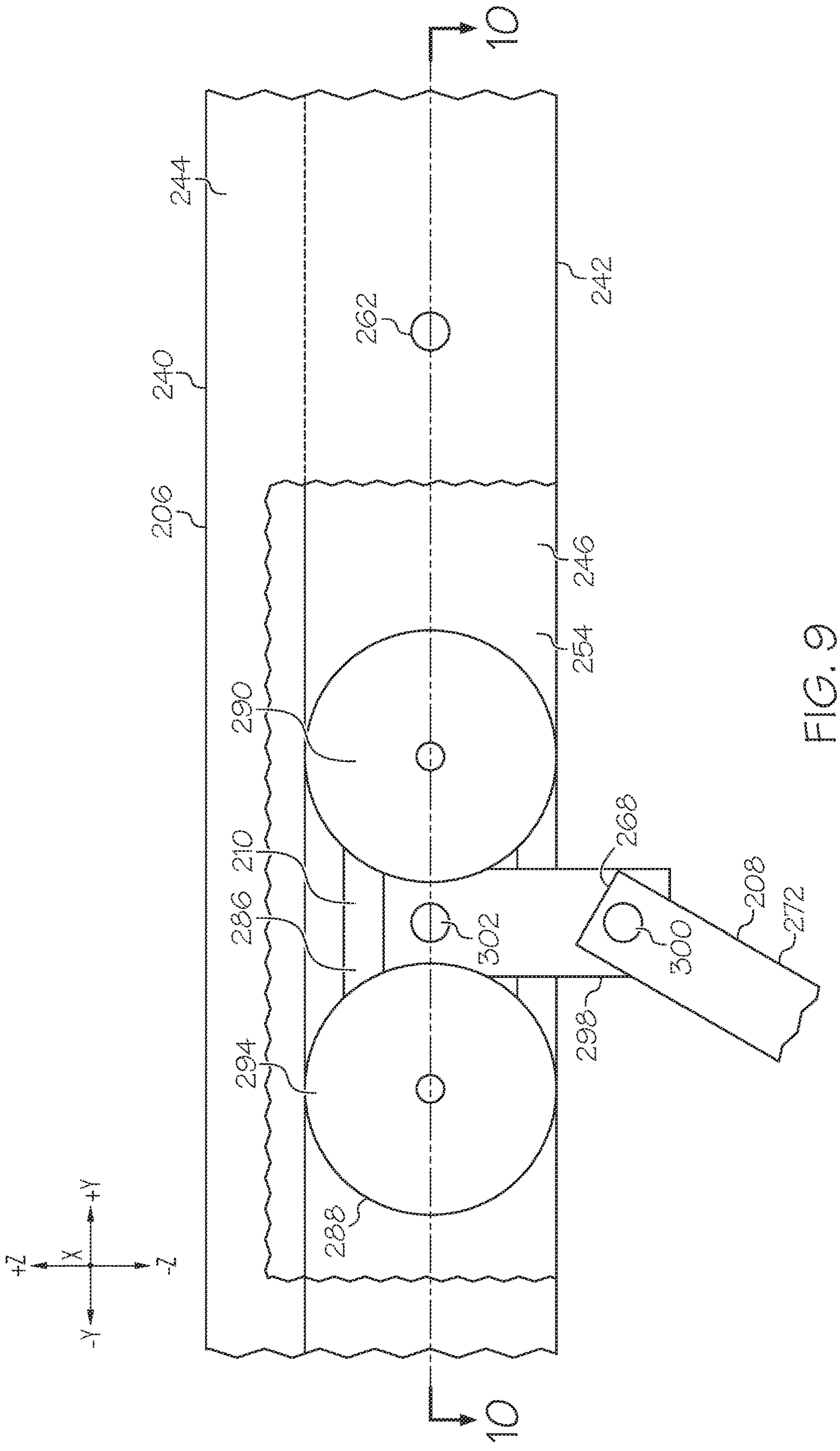
FIG. 9 depicts a partial cutaway side view of a lift arm of the lifting device of FIG. 8 including a carriage according to one or more embodiments shown and described herein.

Reference will now be made in detail to embodiments of lifting devices described herein, examples of which are illustrated in the accompanying drawings. Whenever possible, the same reference numerals will be used throughout the drawings to refer to the same or like parts. One embodiment of a lifting device is depicted in FIG. 1 and generally includes a lift mast, a lift arm pivotally coupled to the lift mast, a lift actuator pivotally coupled to the lift mast at a first end of the lift actuator, and a linkage member pivotally coupled to the lift arm and the lift actuator at respective first and second ends of the linkage member. The lift actuator is selectively positionable in a high range position relative to the lift arm and a low range position relative to the lift arm. Another embodiment of a lifting device is depicted in FIGS. 8-9 and generally includes a lift mast, a lift arm pivotally coupled to the lift mast, a lift actuator pivotally coupled to the lift mast at a first end of the lift actuator, and a carriage at least partially disposed within a cavity of the lift arm. A second end of the lift actuator is pivotally coupled to the carriage and the carriage is movable within the cavity of the lift arm and selectively positionable at at least two points along the cavity. Various embodiments of lifting devices will be described herein with specific reference to the appended drawings.

Throughout the ensuing description, the term "high range position" should be understood as meaning a position in which the lift actuator permits the lift arm to move in a higher range of vertical motion relative to a "low range position," in which the lift arm is restricted to moving in a lower range of vertical motion. More particularly, in the high range position, the lift actuator permits the lift arm to move in a vertical direction between a first range defined by a first height relative to a base of the lifting device when raised and a second height relative to the base of the lifting device when lowered. In the low range position, the lift actuator permits the lift arm to move in a vertical direction between a second range defined by a third height relative to the base of the lifting device when raised and a fourth height relative to the base of the lifting device when lowered. The first height is greater than the third height and the second height is greater than the fourth height.

When in the high range position, the lift actuator permits the lift arm to be raised to a greater height than would otherwise be achieved when in the low range position. This may be desirable when lifting a subject onto a higher surface. When in the low range position, the lift actuator permits the lift arm to be lowered to a lower height than would otherwise be achieved in the high range position. This may be desirable when lowering a subject closer to the floor surface. Accordingly, a lifting device comprising a lift actuator with a high range position and a low range position has a greater range of motion and, therefore, enhanced utility.

It should also be appreciated that the distance between the second end of the lift actuator and the first end of the lift arm, at which the lift arm is coupled to the lift mast and pivots with respect to the lift mast, is greater in the low range position than in the high range position. As a result, the same speed of extension and retraction of the lift actuator results in a lower speed of raising and lowering of the lift arm when in the low range position. Lowering a subject at a lower speed may be desirable when lowering a subject closer to the floor surface.

With more particularity and with reference to FIG. 1, a lifting device 12 is illustrated according to one or more embodiments described herein. The lifting device 12 may generally comprise a base 14, a lift mast 16 extending upwardly from the base 14, a lift arm 18 pivotally coupled to the lift mast 16, a lift actuator 20 pivotally coupled to the lift mast 16, and a linkage member 22 pivotally coupling the lift actuator 20 to the lift arm 18. The lift arm 18 and the linkage member 22 together comprise a lift arm assembly. It is to be appreciated that the lift arm assembly may be suitable as a retrofit onto an existing lift device including a lift actuator and a lift arm by replacing the existing lift arm and attaching the lift arm 18 of the lift assembly to the existing lift actuator.

With respect to the embodiment of the lifting device 12 disclosed herein, the base 14 may comprise a pair of base legs 24*a*, 24*b* which are pivotally coupled to a cross support 28 at a pair of base leg pivots 26*a*, 26*b* such that the base legs 24*a*, 24*b* may be pivotally adjusted with respect to the lift mast 16. The base legs 24*a*, 24*b* may additionally comprise a pair of front castors 30, 32 and a pair of rear castors 34, 36. The rear castors 34, 36 may comprise castor brakes (not shown).

In one embodiment, the base 14 may further comprise a mast support 38 disposed on the cross support 28. In one embodiment, the mast support 38 may be a rectangular receptacle configured to receive the lift mast 16 of the lifting device 12. For example, a first end 40 of the lift mast 16 may be adjustably received in the mast support 38 and secured with a pin, threaded fastener, or a similar fastener coupled to an adjustment handle 42. The pin or threaded fastener extends through the mast support 38 and into a corresponding adjustment hole(s) (not shown) on the lift mast 16. Accordingly, it will be understood that the position of the lift mast 16 may be adjusted vertically (e.g., in the +/−Z directions of the coordinate axes depicted in the figures) with respect to the base 14 by repositioning the lift mast 16 in the mast support 38. The lift mast 16 may further comprise at least one handle 44 coupled to the lift mast 16. The handle 44 may provide an operator with a grip for moving the lifting device 12 on the casters 30, 32, 34, 36. Accordingly, it will be understood that, in at least one embodiment, the lifting device 12 is mobile.

The lift arm 18 has a first end 46, a second end 48, an upper wall 50, a lower wall 52, and a pair of opposite side walls 54, 56. The first end 46 of the lift arm 18 is pivotally coupled to a second end 41 of the lift mast 16 at a lift arm pivot 58 such that the lift arm 18 may be pivoted (e.g., raised and lowered) with respect to the base 14. The lift arm 18 may comprise at least one attachment accessory 60 (a sling bar in the illustrated embodiment) coupled to the lift arm 18 by an attachment coupling 62. In the embodiment shown in FIG. 1, the attachment coupling 62 is pivotally coupled to the second end 48 of the lift arm 18 opposite the lift arm pivot 58. In one embodiment, the attachment coupling 62 is pivotally coupled to the lift arm 18 at an attachment pivot 63 such that the attachment accessory 60 may pivot with respect to the lift arm 18. However, it should be understood that, in other embodiments, the attachment coupling 62 may be fixedly coupled to the lift arm 18 or that the attachment accessory 60 may be directly coupled to the lift arm 18 without the use of the attachment coupling 62.

In the embodiments described herein, the lifting device 12 is a mechanized lifting device. Accordingly, raising and lowering the lift arm 18 with respect to the base 14 may be achieved using the lift actuator 20. In the embodiments shown, the lift actuator 20, having a first end 64 and a second end 66, is a linear actuator that comprises a lift motor 68 mechanically coupled to a lift actuator arm 70. More specifically, the lift motor 68 may comprise a rotating armature (not shown) and the lift actuator arm 70 may comprise one or more threaded rods coupled to the armature such that, when the armature is rotated, the threaded rods are extended or retracted relative to one another and the lift actuator arm 70 is extended or retracted. In the embodiment shown in FIG. 1, the lift actuator 20 further comprises a support tube 72 disposed over the lift actuator arm 70. The support tube 72 provides lateral support (e.g., support along the X and Y axes of the coordinate axes depicted in the drawings) to the lift actuator arm 70 as the lift actuator arm 70 is extended.

The lift actuator 20 may further comprise one or more limit switches coupled to the lift actuator arm 70. For example, the lift actuator arm 70 may comprise an upper limit switch 74 and a lower limit switch 76, shown in FIG. 7, which are mechanically coupled to the lift actuator arm 70 and electrically coupled to a control unit 78. The upper limit switch 74 may provide the control unit 78 of the lifting device 12 with an electrical signal indicating that the lift actuator arm 70 is fully extended (i.e., at an upper end position) while the lower limit switch 76 may provide the control unit 78 with an electrical signal indicating that the lift actuator arm 70 is fully retracted (i.e., at a lower end position), as will be described in more detail herein.

In the embodiment shown in FIG. 1, the lift actuator 20 is pivotally coupled to the lift mast 16 and pivotally coupled to the lift arm 18. In particular, the lift mast 16 comprises a bracket 80 to which the lift motor 68 of the lift actuator 20 is coupled while the lift actuator arm 70 is pivotally coupled to the lift arm 18 via the linkage member 22, as will be described in more detail herein. Accordingly, it should be understood that, by actuating the lift actuator 20 with the lift motor 68, the lift actuator arm 70 is extended or retracted thereby raising or lowering the lift arm 18 relative to the base 14. In one embodiment, the lift actuator 20 may further comprise an emergency release 82. The emergency release 82 facilitates the manual retraction of the lift actuator arm 70 in the event of a mechanical or electrical malfunction of the lift actuator 20.

While the embodiments described herein refer to the lift actuator 20 as comprising a lift motor 68 and a lift actuator arm 70, it will be understood that the lift actuator 20 may have various other configurations and may include a hydraulic or pneumatic actuator comprising a mechanical pump or compressor or a similar type of actuator. Further, in other embodiments, where the lifting device 12 is a cable-based lift system, the lift actuator 20 may be a motor that pays out and/or takes-up cable, thereby raising and/or lowering a coupled load. Accordingly, it will be understood that various other types of actuators may be used to facilitate raising and lowering the lift arm 18 and/or a coupled load with respect to the base 14.

Figure 2:
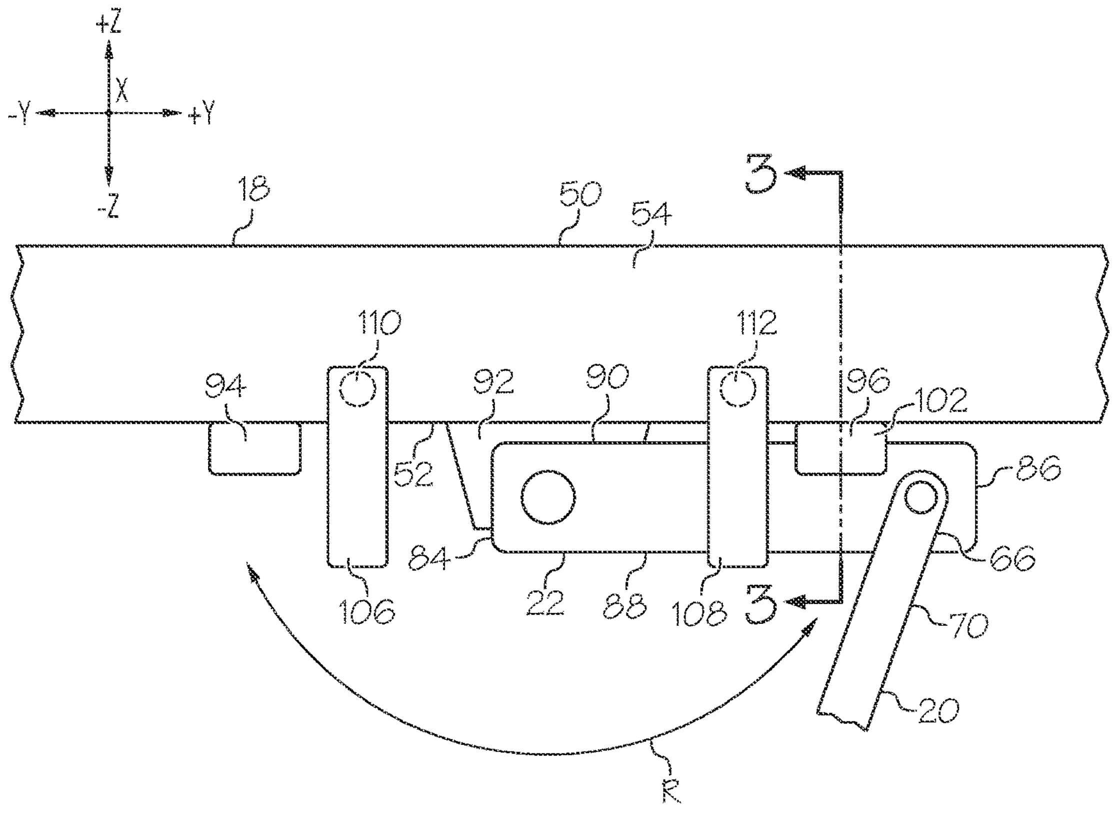
FIG. 2 depicts a partial side view of the lift arm and the lift actuator in a low range position according to one or more embodiments shown and described herein.

As described herein, the first end 64 of the lift actuator 20 is pivotally coupled to the lift mast 16 and the second end 66 of the lift actuator 20 is pivotally coupled to the lift arm 18 via the linkage member 22. As shown in more detail in FIGS. 2-3, the linkage member 22 is an elongated member having a first end 84 and a second end 86. The linkage member 22 also has a first surface 88 and an opposite second surface 90. The linkage member 22 is pivotally coupled to a linkage bracket 92 proximate the first end 84 of the linkage member 22 by a fastener, such as a pin or the like. The linkage bracket 92 extends from or is mounted to the lower wall 52 of the lift arm 18. It may be understood that, although not shown, the linkage bracket 92 may extend from opposite side walls 54, 56 of the lift arm 18 and be pivotally coupled to the linkage member 22 proximate the first end 84. In embodiments, the linkage bracket 92 may be a yoke/pin connection or a clevis/pin connection. The linkage member 22 pivots with respect to the linkage bracket 92 and the lift arm 18 as shown by arrow R. Thus, the linkage member 22 pivots between a first position, as shown in FIG. 1, in which the first surface 88 of the linkage member 22 faces the lower wall 52 of the lift arm 18, and a second position, as shown in FIG. 2, in which the second surface 90 of the linkage member 22 faces the lower wall 52 of the lift arm 18. The second end 66 of the lift actuator 20 is pivotally coupled to the linkage member 22 proximate the second end 86 of the linkage member 22 for moving the lift actuator 20 between a high range position, as shown in FIG. 1, and a low range position, as shown in FIG. 2. As such, the first position of the linkage member 22 corresponds to the high range position of the lift actuator 20 (e.g., where the second end 66 of the lift actuator 20 is positioned between the linkage bracket 92 and the lift mast 16) and the second position of the linkage member 22 corresponds to the low range position of the lift actuator 20 (e.g., where the linkage bracket 92 is positioned between the second end 66 of the lift actuator 20 and the lift mast 16).

In embodiments, a pair of spaced apart stabilizers 94, 96 is provided for stabilizing the linkage member 22 in the +/−X directions. The stabilizers 94, 96 are provided on opposite sides of the linkage bracket 92 on the lower wall 52 of the lift arm 18. Specifically, a first stabilizer 94 is positioned between the first end 46 of the lift arm 18 and the linkage bracket 92 and the second stabilizer 96 is positioned between the second end 48 of the lift arm 18 and the linkage bracket 92.

Figure 3:
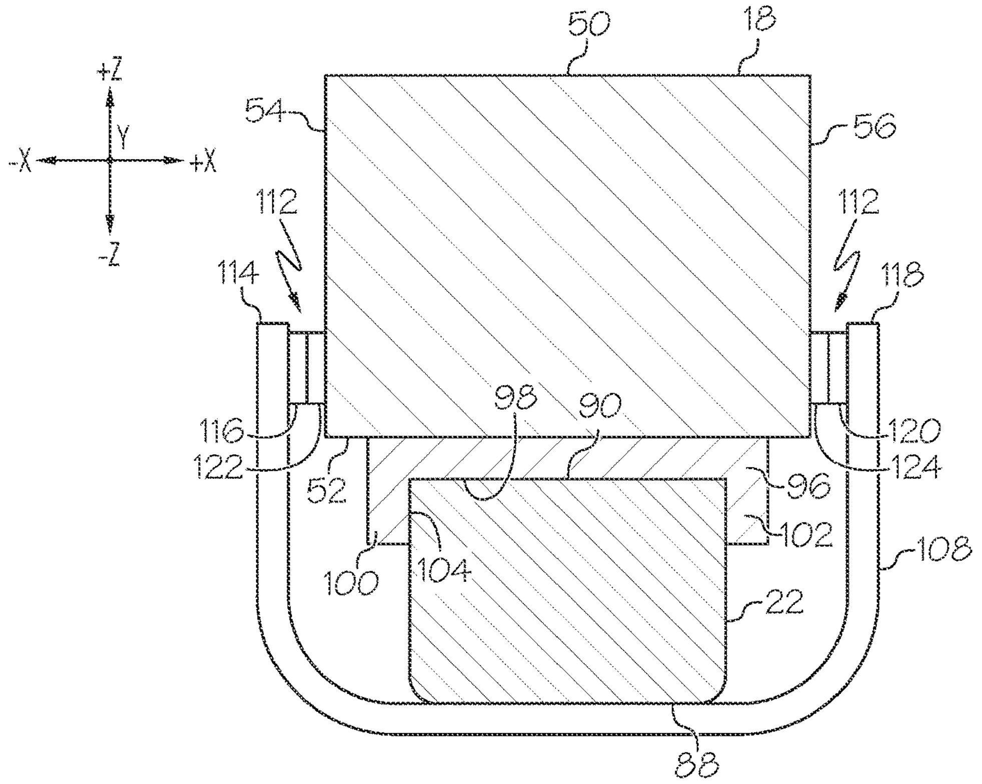
FIG. 3 depicts a cross-sectional front view of the lift arm taken along line 3-3 of FIG. 2 according to one or more embodiments shown and described herein.

Each stabilizer 94, 96 is identical in structure and, thus, only the second stabilizer 96 will be described in detail. As shown in FIG. 3, in embodiments, the second stabilizer 96 includes a pair of side walls 100, 102 extending perpendicular to the lower wall 52 of the lift arm 18 defining a channel 104 formed therebetween for receiving the linkage member 22. Thus, a width of the channel 104 is at least slightly larger than a width of the linkage member 22 such that the stabilizer 94, 96 can receive the linkage member 22 and restrict lateral movement in the +/−X directions. When the linkage member 22 is in the second position, as shown in FIG. 2, the second surface 90 of the linkage member 22 faces the lower wall 52 of the lift arm 18 and the first surface 88 of the linkage member 22 faces the opposite direction away from the lower wall 52 of the lift arm 18. Thus, it is to be understood that when the linkage member 22 is in the first position, the first surface 88 of the linkage member 22 faces the lower wall 52 of the lift arm 18 and the second surface 90 faces the opposite direction away from the lower wall 52 of the lift arm 18. In embodiments, it should be understood that the stabilizers 94, 96 may extend from opposite side walls 54, 56 of the lift arm 18 or, alternatively, from the lower wall 52 of the lift arm 18.

In embodiments, the stabilizers 94, 96 each further includes a base wall 98. As shown in FIG. 3, with respect to the second stabilizer 96, a base wall 98 is mounted to the lower wall 52 of the lift arm 18. The pair of side walls 100, 102 extend from the base wall 98 and perpendicular thereto. As such, when the linkage member 22 is in the second position, as shown in FIG. 2, the second surface 90 of the linkage member 22 abuts against the base wall 98 of the second stabilizer 96. Thus, it is to be understood that when the linkage member 22 is in the first position, the first surface 88 of the linkage member 22 abuts against the base wall of the first stabilizer 94.

In embodiments, a pair of retaining members, such as straps, tethers, bands, ties, or the like, may be provided for securing the linkage member 22 in the first and second positions. As shown in FIGS. 2-3, the retaining members are straps 106, 108 extending from opposite side walls 54, 56 of the lift arm 18 and are secured to the lift arm 18 by fasteners 110, 112, such as buttons, hooks, magnets, hook-and-loop closures or the like. The first and second straps 106, 108, as well as their associated fasteners, are identical. Therefore, only the second strap 108 and its associated fasteners 112, as illustrated in FIG. 3, will be discussed in detail. As shown, the fasteners 112 are buttons including male and female button portions. More particularly, the second strap 108 has a first end 114 including a female button portion 116 and a second end 118 including a female button portion 120. Male button portions 122, 124 are provided on opposite side walls 54, 56 of the lift arm 18 for receiving the female button portions 116, 120, thereby securing the strap 108 on both side walls 54, 56 of the lift arm 18. As shown in FIG. 2, the straps 106, 108 are spaced apart from one another and positioned between each of the stabilizers 94, 96 and the linkage bracket 92. However, the distance between the straps 106, 108 may be adjusted as necessary to support of the linkage member 22 anywhere along the length thereof. Moreover, additional straps may be utilized if desired to further support the linkage member 22 in either the first positon or the second position.

Referring again to FIGS. 1 and 7, the lifting device 12 comprises the control unit 78. The control unit 78 may comprise a battery 126 and may be electrically coupled to the lift actuator 20 and to the upper and lower limit switches 74, 76. The control unit 78 may be operable to receive an input from an operator via a control device coupled to the control unit 78. The control device may comprise a wired controller and/or one or more wireless controllers. For example, in one embodiment, the control device may be a wired controller 128 or, alternatively, a controller integrated into the control unit. In another embodiment, the controller may be a wireless controller such as a wireless hand control 130. Based on the input received from the control device, the control unit 78 is programmed to adjust the position of the lift arm 18 by sending electric control signals to the lift actuator 20. Further, as will be described in more detail herein, the control unit 78 may also be incorporated into a lift control system 132 for the lifting device 12.

Figure 5:
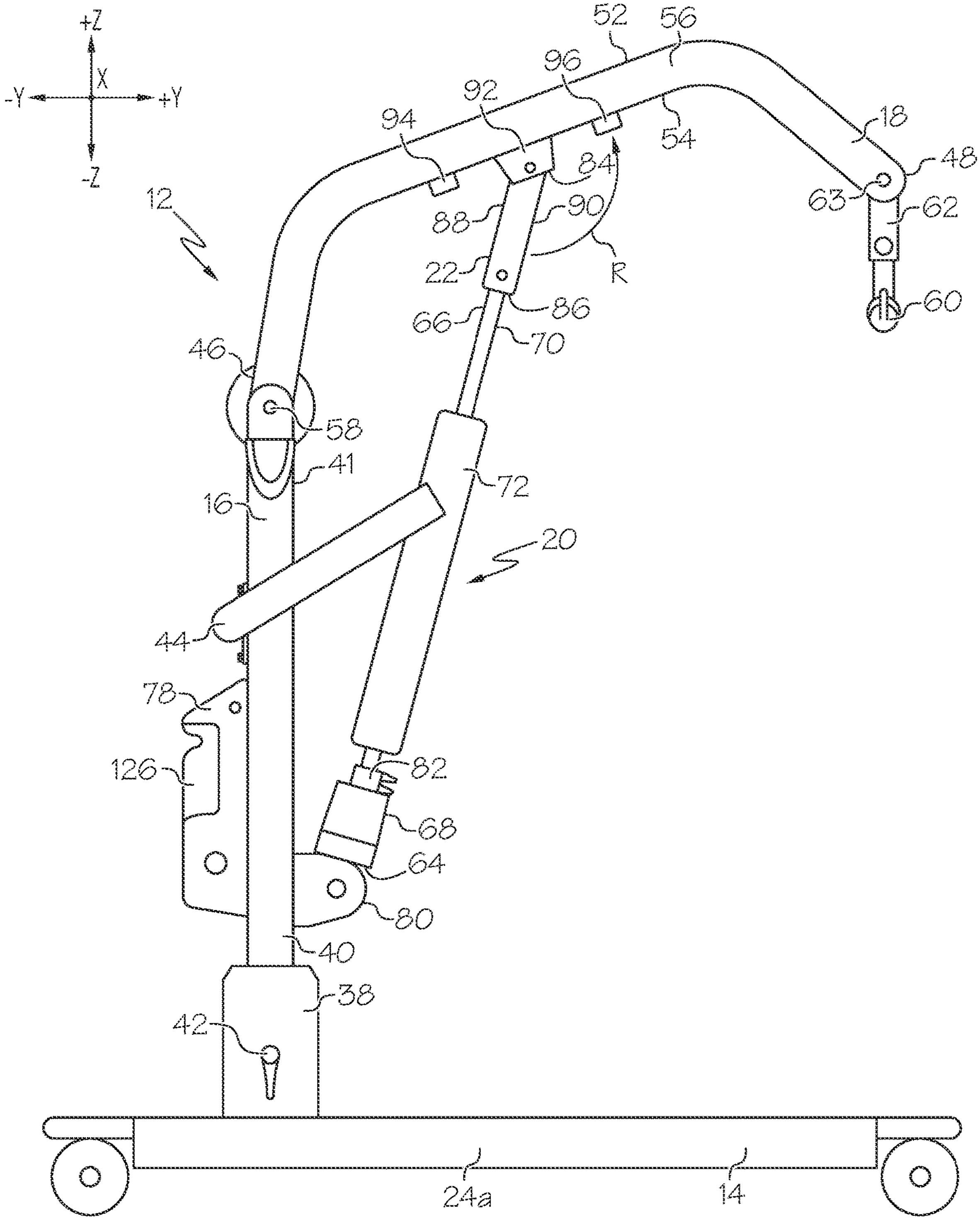
FIG. 5 depicts a side view of the lifting device with the lift actuator transitioning from the high range position toward the low range position according to one or more embodiments shown and described herein.
Figure 6:
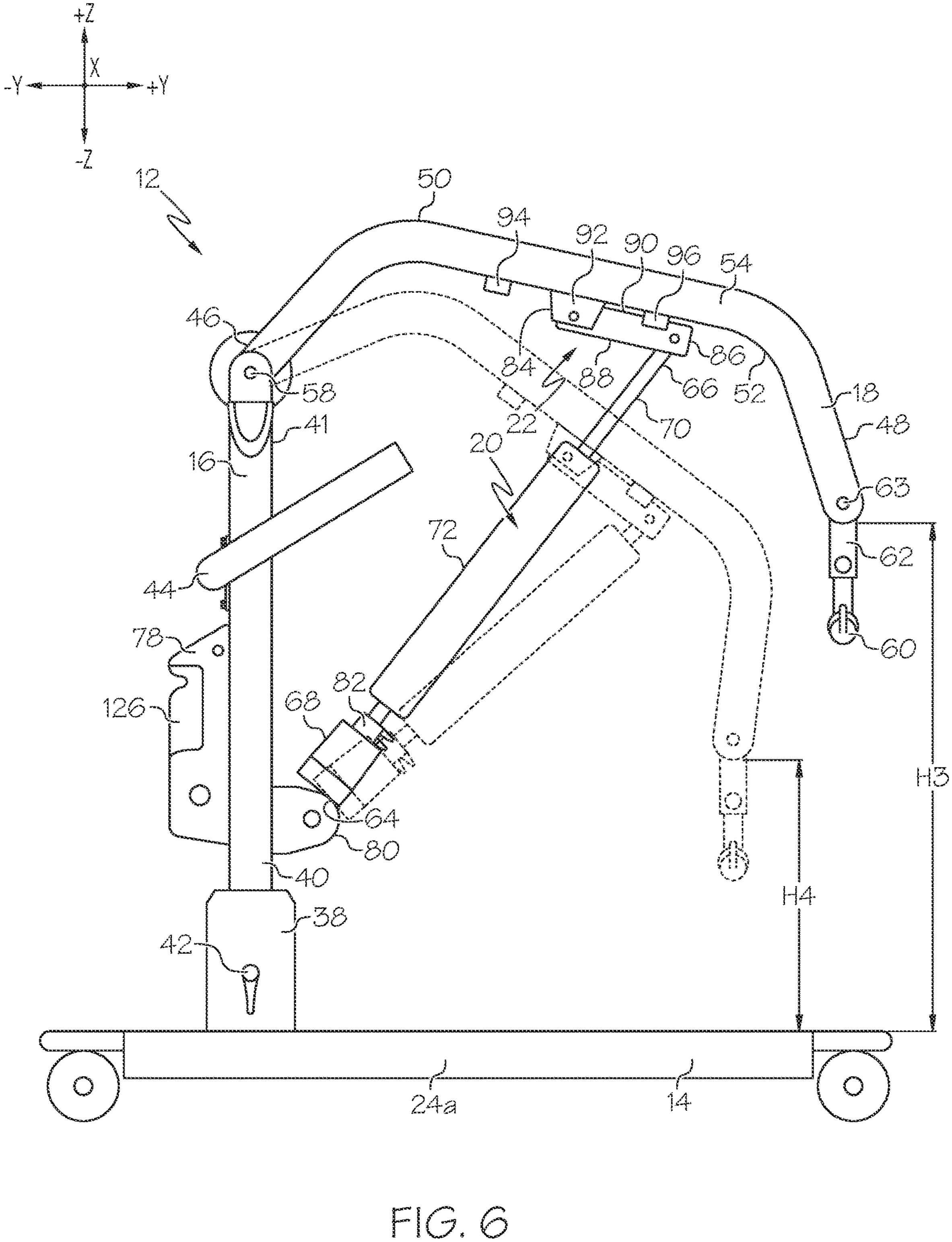
FIG. 6 depicts a side view of the lifting device with the lift actuator in the low range position according to one or more embodiments shown and described herein.
Figure 7:
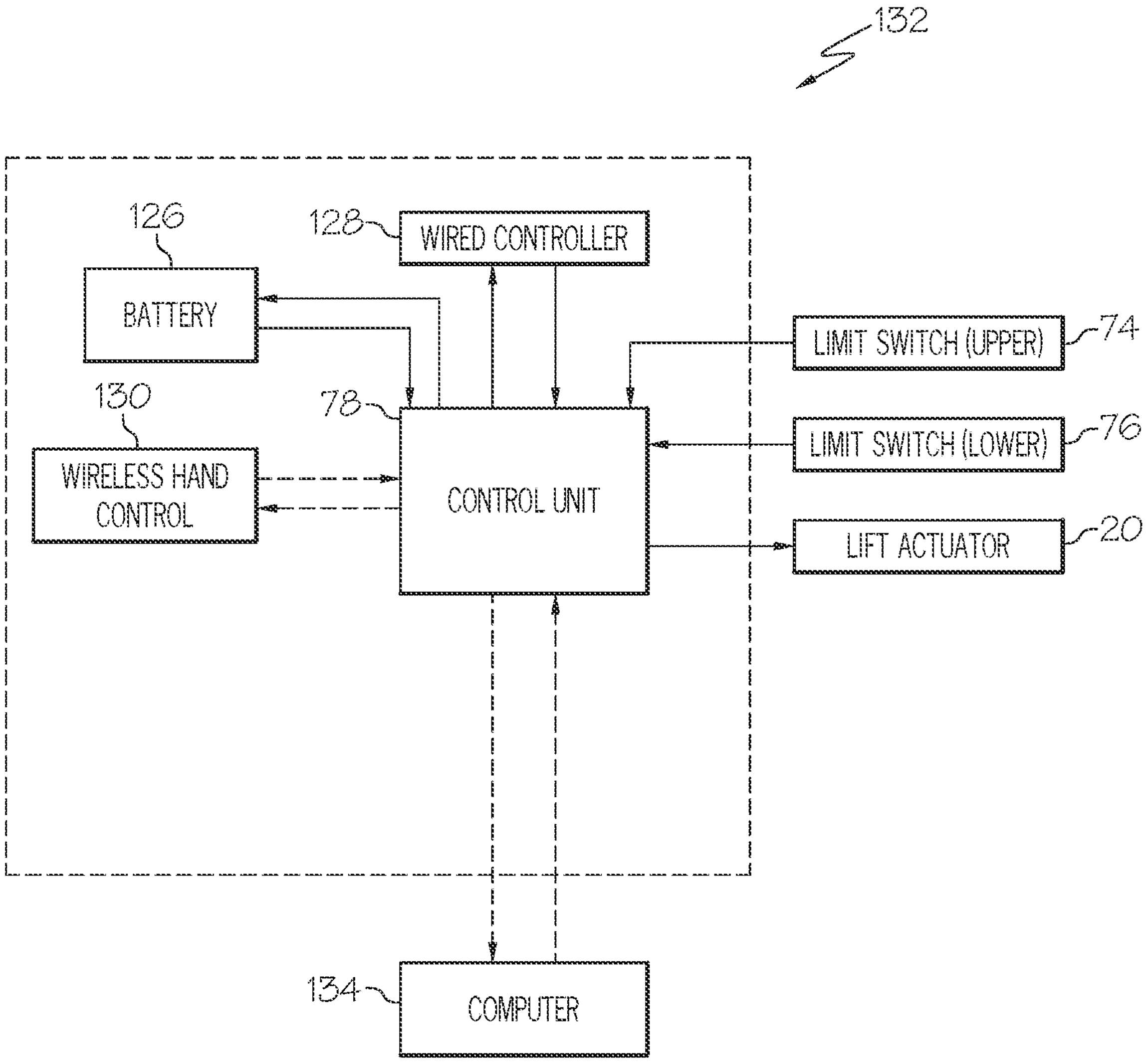
FIG. 7 schematically depicts a block diagram of a lift control system for use in conjunction with the lifting device of FIG. 1 according to one or more embodiments shown and described herein.

As shown in FIG. 7, a block diagram of a lift control system 132 for use in conjunction with the lifting device 12 shown in FIGS. 1-6 is schematically depicted according to one or more embodiments shown and described herein. The lift control system 132 may generally comprise the control unit 78, and a control device such as, for example, the wired controller 128 and/or a wireless controller, such as the wireless hand control 130. In one embodiment, the lift control system 132 may also include the battery 126.

The control unit 78 may generally comprise a central processing unit ("CPU") and associated electrical components, including, without limitation, a processor (not shown) and at least one memory (not shown). The memory includes a set of computer readable and executable instructions, which the processor executes to control the lifting device 12.

The control unit 78 may further comprise at least one port for sending signals to and/or receiving signals from other devices in the lift control system 132. For example, in one embodiment, the control unit 78 comprises at least one transceiver, such as an infrared (IR) transceiver or a radio frequency (RF) transceiver, which may be utilized by the control unit 78 to send data signals to other components of the lift control system 132. In the embodiments shown and described herein, the control unit 78 of the lift control system 132 comprises an IR transceiver, which is operable to send data signals to and receive data signals from the wireless hand control 130.

The control unit 78 may be coupled to a control device such as the wired controller 128 and/or the wireless hand control 130. The wired controller 128 may be integral with the control unit 78 while, in other embodiments, the wired controller 128 may be coupled to the control unit 78 with a cable. In the embodiments shown and described herein, the wired controller 128 is integral with the control unit 78. The wireless hand control 130 includes an IR or RF transceiver such that the wireless hand control 130 is operable to send signals to and receive signals from the control unit 78. Each of the wired controller 128 and the wireless hand control 130 comprises user input controls located on the control unit 78, which may be used to control the lifting device 12. The user input controls may include buttons that may be used to raise and lower the lift arm 18 of the lifting device 12.

As described herein, the control unit 78 may also comprise one or more ports for communicatively connecting the control unit 78 to an external computer 134 or computer system to facilitate downloading data from the control unit 78, uploading data to the control unit 78, and/or reprogramming the control unit 78. For example, the control unit 78 may comprise a USB port, an RS-232 port, an IR port or a similar port to facilitate directly coupling a control unit to the computer or computer system.

In the embodiments where the control unit comprises the battery 126, as depicted in FIG. 2, the control unit 78 also comprises circuitry to charge the battery 126 when the lifting device 12, specifically the lift control system 132 of the lifting device 12, is coupled to a voltage source (e.g., when the lift control system 132 is plugged in to a wall outlet or other source for supplying power to the lift control system 132).

Operation of the lifting device 12 will now be described in more detail with reference to FIGS. 1-7.

Figure 4:
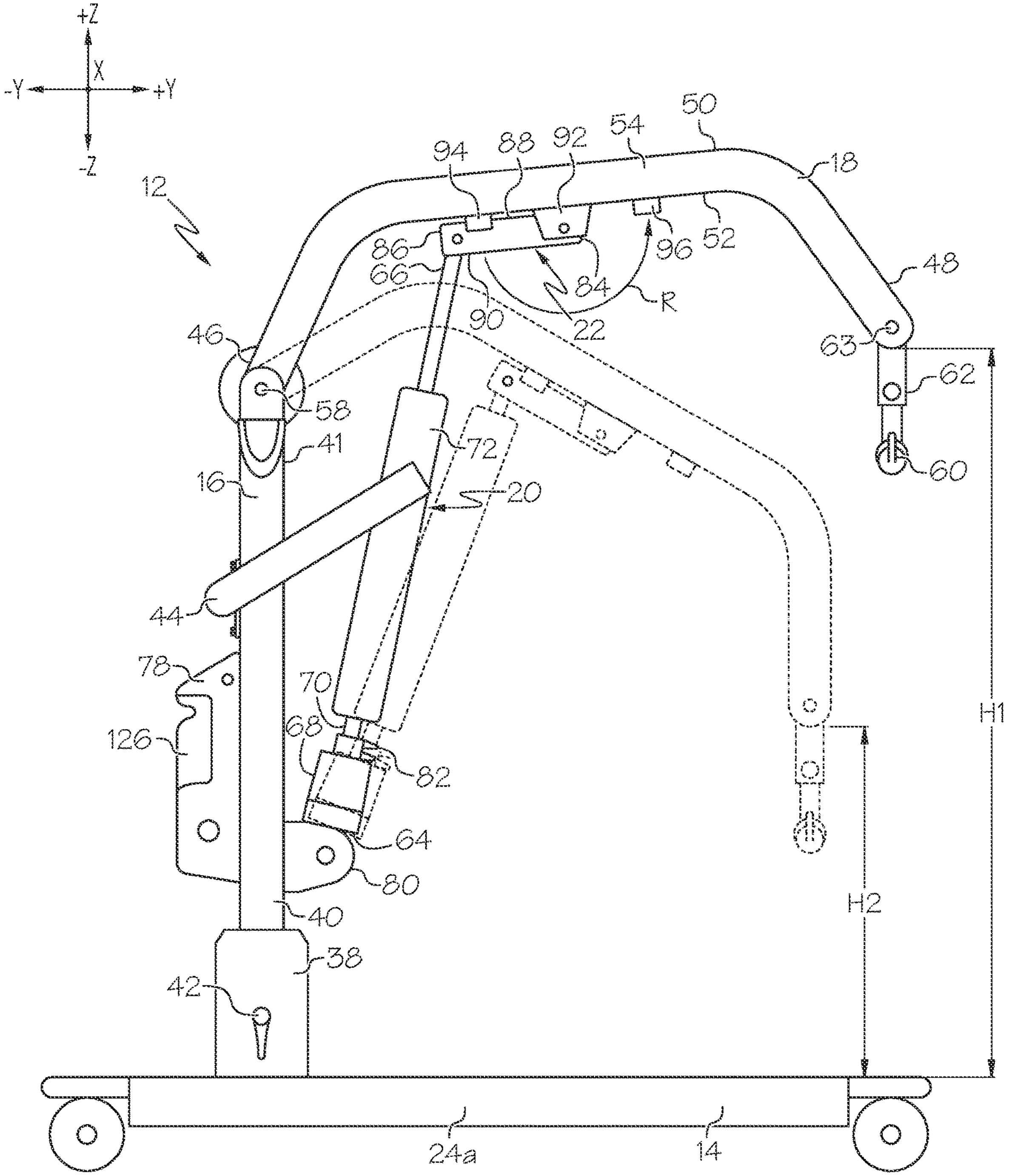
FIG. 4 depicts a side view of the lifting device with the lift actuator in the high range position accordingly to one or more embodiments shown and described herein.

As shown in FIG. 4, the lift actuator 20 is illustrated as being fully extended and in the high range position. In the high range position, the first end 84 of the linkage member 22 is pivoted about the linkage bracket 92 toward the first end 46 of the lift arm 18. When no stabilizers 94, 96 are provided, the first surface 88 of the linkage member 22 abuts directly against the lower wall 52 of the lift arm 18. Thus, actuation of the lift actuator 20 from the retracted state to the extended state forces the linkage member 22 to press against the lower wall 52 of the lift arm 18, thereby raising the lift arm 18 in the vertical direction (e.g., the +Z direction). When the lift actuator 20 is operated to retract, the force of the linkage member 22 against the lower wall 52 of the lift arm 18 is reduced, which allows the lift arm 18 to lower.

When the stabilizers 94, 96 are provided, the linkage member 22 is positioned between the side walls and within the channel of the first stabilizer 94 to prevent movement of the linkage member 22, and thus the lift actuator 20, in the +/−X directions. Furthermore, although not shown in FIGS. 4-6, it is to be understood that, when in the high range position, the first strap 106 may be used to further secure the linkage member 22 in the first position and minimizing longitudinal separation of the linkage member 22 from the lift arm 18 in the +/Z directions, as well as lateral separation in the +/−X directions.

Also shown in FIG. 4 in phantom is the lift arm 18 when the lift actuator 20 is in the fully retracted position. As such, the lift arm 18 is operable between a first height H1 with respect to the base 14 of the lifting device 12 when the lift actuator 20 is in the fully extended position and a second height H2 with respect to the base 14 of the lifting device 12 when the lift actuator 20 is in the fully retracted position.

When it is desired to move the lift arm 18 within a lower range of vertical motion, for example, to lower a subject closer to the floor surface, and/or lower a subject at a slower speed, the lift actuator 20 is moved toward the low range position, as shown in FIG. 6. In embodiments, moving the lift actuator 20 toward the low range position from the high range position is done manually. As shown in FIG. 5, the lifting device 12 illustrates the lift actuator 20 transitioning from the high range position toward the low range position by first raising the lift arm 18. Specifically, raising the lift arm 18 releases the linkage member 22 from the first position and allows the linkage member 22 to freely pivot about the linkage bracket 92 to a temporary intermediate position. Over raising of the lift arm 18 may be permitted as conventional lift actuators permit free extension without being actively operated under power.

To allow the linkage member 22 to complete the rotation, as shown by arrow R, the lift arm 18 is lowered as the linkage member 22 is simultaneously rotated toward the second end 48 of the lift arm 18 and into the second position. This results in the lift actuator 20 being positioned in the low range position as shown in FIG. 6. As illustrated therein, when no stabilizers 94, 96 are provided, the second surface 90 of the linkage member 22 abuts directly against the lower wall 52 of the lift arm 18. Thus, actuation of the lift actuator 20 from the retracted state to the extended state forces the linkage member 22 to press against the lower wall 52 of the lift arm 18, thereby raising the lift arm 18. When the lift actuator 20 is operated to retract, the force of the linkage member 22 against the lower wall 52 of the lift arm 18 is reduced, which allows the lift arm 18 to lower.

When the stabilizers 94, 96 are provided, the linkage member 22 is positioned between the side walls 100, 102 and within the channel 104 of the second stabilizer 96 to prevent movement of the linkage member 22, and thus the lift actuator 20, in the +/−X directions. Furthermore, although not shown in FIGS. 4-6, it is to be understood that, when in the high range position, the second strap 108 may be used to further secure the linkage member 22 in the second position and prevent the linkage member 22 from separating from the lift arm 18 in the —Z direction.

Also shown in FIG. 6 in phantom is the lift arm 18 when the lift actuator 20 is in the fully retracted position. As such, the lift arm 18 moveable between a third height H3 with respect to the base 14 of the lifting device 12 when the lift actuator 20 is in the fully extended position and a fourth height H4 with respect to the base 14 of the lifting device 12 when the lift actuator 20 is in the fully retracted position. It should be appreciated that the first height H1 is greater than the third height H3 and the second height H2 is greater than the fourth height H4. Thus, the vertical range of motion of the lift arm 18 when in the high range position, shown in FIG. 4, is greater than the vertical range of motion of the lift arm 18 when in the low range position.

As described herein, to operate the lift actuator 20 in either the high range or the low range position, the control unit 78 is operable to utilize the computer readable and executable instructions and to output a control signal to the lift actuator 20 based on input signals received from the wireless hand control 130 and/or the wired controller 128. When the lifting device 12 is actuated with one of the control devices, the lift control system 132 outputs a control signal from the control unit 78 to the lift actuator 20, which actuates the lift actuator 20 thereby causing the lift arm 18 to be raised or lowered with respect to the base 14.

It should be appreciated that moving the lift actuator 20 from the high range position toward the low range position allows the lift arm 18 to be lowered to a reduced height and moved at a reduced speed. This is because the second end 66 of the lift actuator 20 is coupled to the lift arm 18 at a greater distance in the low range position than in the high range position.

With reference now to FIGS. 8-9, another embodiment of a lifting device 200 is illustrated. The lifting device 200 may generally comprise a base 202, a lift mast 204 extending upwardly from the base 202, a lift arm 206 pivotally coupled to the lift mast 204, a lift actuator 208 pivotally coupled to the lift mast 204, and a carriage 210 pivotally coupled to the lift actuator 208 opposite the lift mast 204 and selectively positionable along a length of the lift arm 206. As such, the lift actuator 208 may be positioned within at least a high range position and a low range position. In embodiments, the lift actuator 208 is also selectively positionable within at least one intermediate position.

The base 202 may comprise a pair of base legs 214*a*, 214*b*, which are pivotally coupled to a cross support 218 at a pair of base leg pivots 216*a*, 216*b* such that the base legs 214*a*, 214*b* may be pivotally adjusted with respect to the lift mast 204. The base legs 214*a*, 214*b* may additionally comprise a pair of front castors 220, 222 and a pair of rear castors 224, 226. The rear castors 224, 226 may comprise castor brakes (not shown).

In one embodiment, the base 202 may further comprise a mast support 228 disposed on the cross support 218. In one embodiment, the mast support 228 may be a rectangular receptacle configured to receive the lift mast 204 of the lifting device 200. For example, a first end 230 of the lift mast 204 may be adjustably received in the mast support 228 and secured with a pin, threaded fastener, or a similar fastener coupled to an adjustment handle 232. The pin or threaded fastener extends through the mast support 228 and into a corresponding adjustment hole(s) (not shown) on the lift mast 204. Accordingly, it will be understood that the position of the lift mast 204 may be adjusted vertically (e.g., in the +/−Z directions of the coordinate axes depicted in the figures) with respect to the base 202 by repositioning the lift mast 204 in the mast support 228. The lift mast 204 may further comprise at least one handle 234 coupled to the lift mast 204. The handle 234 may provide an operator with a grip for moving the lifting device 200 on the casters 220, 222, 224, 226. Accordingly, it will be understood that, in at least one embodiment, the lifting device 200 is mobile.

The lift arm 206 has a first end 236, a second end 238, an upper wall 240, a lower wall 242, and a pair of opposite side walls 244, 246. The first end 236 of the lift arm 206 is pivotally coupled to the second end 231 of the lift mast 204 at a lift arm pivot 248 such that the lift arm 206 may be pivoted (e.g., raised and lowered) with respect to the base 202. The lift arm 206 may comprise at least one attachment accessory 250 (a sling bar in the illustrated embodiment) coupled to the lift arm 206 by an attachment coupling 252. In the embodiment shown in FIG. 8, the attachment coupling 252 is pivotally coupled to the lift arm 206 at the second end 238 of the lift arm 206 opposite the lift arm pivot 248. In one embodiment, the attachment coupling 252 is pivotally coupled to the lift arm 206 at an attachment pivot 253 such that the attachment accessory 250 may pivot with respect to the lift arm 206. However, it should be understood that, in other embodiments, the attachment coupling 252 may be fixedly coupled to the lift arm 206 or that the attachment accessory 250 may be directly coupled to the lift arm 206 without the use of the attachment coupling 252.

Figure 10:
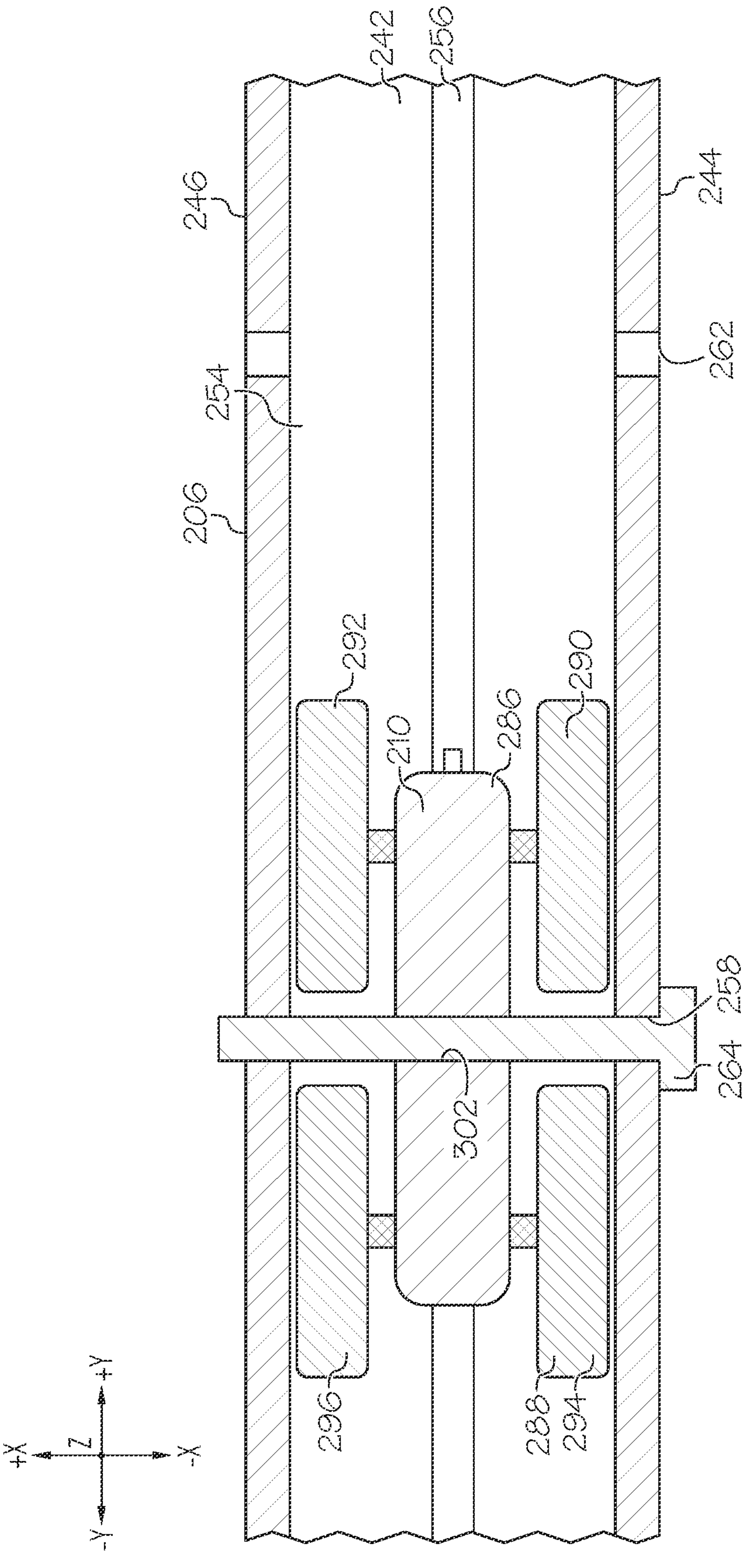
FIG. 10 depicts a cross-sectional top view of the lift arm taken along the like 10-10 of FIG. 9 according to one or more embodiments shown and described herein.

Referring to FIGS. 8-10, the lift arm 206 includes a cavity 254 formed at least partially within the lift arm 206 and extending at least partially along a length thereof. In embodiments, the cavity 254 is defined by the upper wall 240, the lower wall 242, and the side walls 244, 246 of the lift arm 206. In embodiments, the lift arm 206 includes a channel 256 for permitting a connection between the carriage 210 and the lift actuator 208. In embodiments, the channel 256 may be formed in one of the side walls 244, 246 of the lift arm 206. As shown in FIG. 10, the channel 256 is formed in the lower wall 242 of the lift arm 206. In embodiments, the lift arm 206 includes at least two apertures 258, 260 formed in at least one of the side walls 244, 246 of the lift arm 206. The at least two apertures 258, 260 correspond to positions for locking the lift actuator 208 in a high range position and in a low range position. In embodiments, there may be at least one intermediate aperture 262 for positioning the lift actuator 208 in a position between the high range position and the low range position. As shown in FIG. 8, and discussed in more detail herein, a fastener 264, such as a pin or a threaded fastener, may be inserted through one of the apertures 258 for locking the carriage 210 in position within the cavity 254 along the length of the lift arm 206, i.e., the +/−Y directions.

In the embodiments described herein, the lifting device 200 is a mechanized lifting device. Accordingly, raising and lowering the lift arm 206 with respect to the base 202 may be achieved using the lift actuator 208. In the embodiments shown, the lift actuator 208, having a first end 266 and a second end 268, is a linear actuator that comprises a lift motor 270 mechanically coupled to a lift actuator arm 272. More specifically, the lift motor 270 may comprise a rotating armature (not shown) and the lift actuator arm 272 may comprise one or more threaded rods coupled to the armature such that, when the armature is rotated, the threaded rods are extended or retracted relative to one another and the lift actuator arm 272 is extended or retracted. In the embodiment shown in FIG. 8, the lift actuator 208 further comprises a support tube 274 disposed over the lift actuator arm 272. The support tube 274 provides lateral support (e.g., support in the X and Y axes) to the lift actuator arm 272 as the lift actuator arm 272 is extended.

The lift actuator 208 may further comprise one or more limit switches coupled to the lift actuator arm 272. For example, the lift actuator arm 272 may comprise an upper limit switch 276 and a lower limit switch 278, shown in FIG. 12, which are mechanically coupled to the lift actuator arm 272 and electrically coupled to a control unit 280. The upper limit switch 276 may provide the control unit 280 of the lifting device 200 with an electrical signal indicating that the lift actuator arm 272 is fully extended (i.e., at an upper end position) while the lower limit switch 278 may provide the control unit 280 with an electrical signal indicating that the lift actuator arm 272 is fully retracted (i.e., at a lower end position), as will be described in more detail herein.

In the embodiment shown in FIGS. 8-9, the lift actuator 208 is pivotally coupled to the lift mast 204 and pivotally coupled to the carriage 210, which is at least partially disposed within the cavity 254 of the lift arm 206, as will be discussed in more detail herein. In particular, the lift mast 204 comprises a bracket 282 to which the lift motor 270 of the lift actuator 208 is coupled while the lift actuator arm 272 is slidably movable at the lift arm 206 due to the lift actuator 208 being pivotally coupled to the carriage 210. Accordingly, it should be understood that, by actuating the lift actuator 208 with the lift motor 270, the lift actuator arm 272 is extended or retracted thereby raising or lowering the lift arm relative to the base 202. In one embodiment, the lift actuator 208 may further comprise an emergency release 284. The emergency release 284 facilitates the manual retraction of the lift actuator arm 272 in the event of a mechanical or electrical malfunction of the lift actuator 208.

While the embodiments described herein refer to the lift actuator 208 as comprising a lift motor 270 and a lift actuator arm 272, it will be understood that the lift actuator 208 may have various other configurations and may include a hydraulic or pneumatic actuator comprising a mechanical pump or compressor or a similar type of actuator. Further, in other embodiments, where the lifting device 200 is a cable-based lift system, the lift actuator 208 may be a motor that pays out and/or takes-up cable thereby raising and/or lowering a coupled load. Accordingly, it will be understood that various other types of actuators may be used to facilitate raising and lowering the lift arm 206 and/or a coupled load with respect to the base 202.

As described herein, the first end 266 of the lift actuator 208 is pivotally coupled to the lift mast 204 and the second end 268 of the lift actuator 208 is pivotally coupled to the carriage 210, which is slidably movable at least partially within the cavity 254 of the lift arm 206. With more particularity, as shown in FIGS. 9-10, one embodiment of the carriage 210 includes a body 286 and at least one translation member 288 coupled to the body 286. It is to be understood that the translation member 288 may be any suitable mechanism for translating the carriage 210 within the cavity 254, such as a wheel, a rail, or any other suitable means. As shown, the translation member 288 is a plurality of wheels including a pair of front wheels 290, 292 and a pair of rear wheels 294, 296. However, other configurations may be contemplated in which any number of wheels are used, such as only a single wheel on a side of the body 286 or surrounding the body 286, or a pair of wheels with one wheel on each side or end of the body 286. However, providing the pair of front wheels 290, 292 and the pair of rear wheels 294, 296 provides the carriage 210 with optimal stability within the cavity 254 and avoids leaning to one side or an end.

To limit movement of the carriage 210 within the cavity along the X and Z axes, the carriage 210 is dimensioned such that there is minimal space between the wheels 290, 292, 294, 296 of the carriage 210 and the side walls 244, 246 of the lift arm 206, as well as minimal space between the wheels 290, 292, 294, 296 and the upper and lower walls 240, 242 of the lift arm 206. In embodiments, a track (not shown) is provided within the cavity 254 for engaging the wheels 290, 292, 294, 296 of the carriage 210. This ensures that the wheels 290, 292, 294, 296 move appropriately along the length of the lift arm 206.

In embodiments, the second end 268 of the lift actuator 208 is pivotally coupled directly to the body 286 of the carriage 210 itself at a pivot 300. Thus, either a portion of the carriage 210 or the lift actuator 208 extends through a portion of the lift arm 206, for example, through the channel 256 formed in the lower wall 242 of the lift arm 206, to be pivotally coupled to one another. In embodiments, the body 286 of the carriage 210 includes a finger 298, which includes the pivot 300, that extends through the channel 256 formed in the lower wall 242 of the lift arm 206 to be pivotally coupled to the second end 268 of the lift actuator 208. This permits the channel 256 to be dimensionally smaller than the second end 268 of the lift actuator 208 and not having to accommodate receiving the second end 268 of the lift actuator 208. In the embodiment described herein, an aperture 302 is formed through the body 286 of the carriage 210 for receiving the fastener 264 extending through one of the apertures 258 formed in at least one of the side walls 244, 246 of the lift arm 206 to lock the carriage 210 in position within the cavity 254 of the lift arm 206. In embodiments, the apertures 258 may be formed in the top wall 240 or the bottom wall 242 of the lift arm 206 and the fastener 264 may engage the aperture 302 of the carriage 210.

Figure 11:
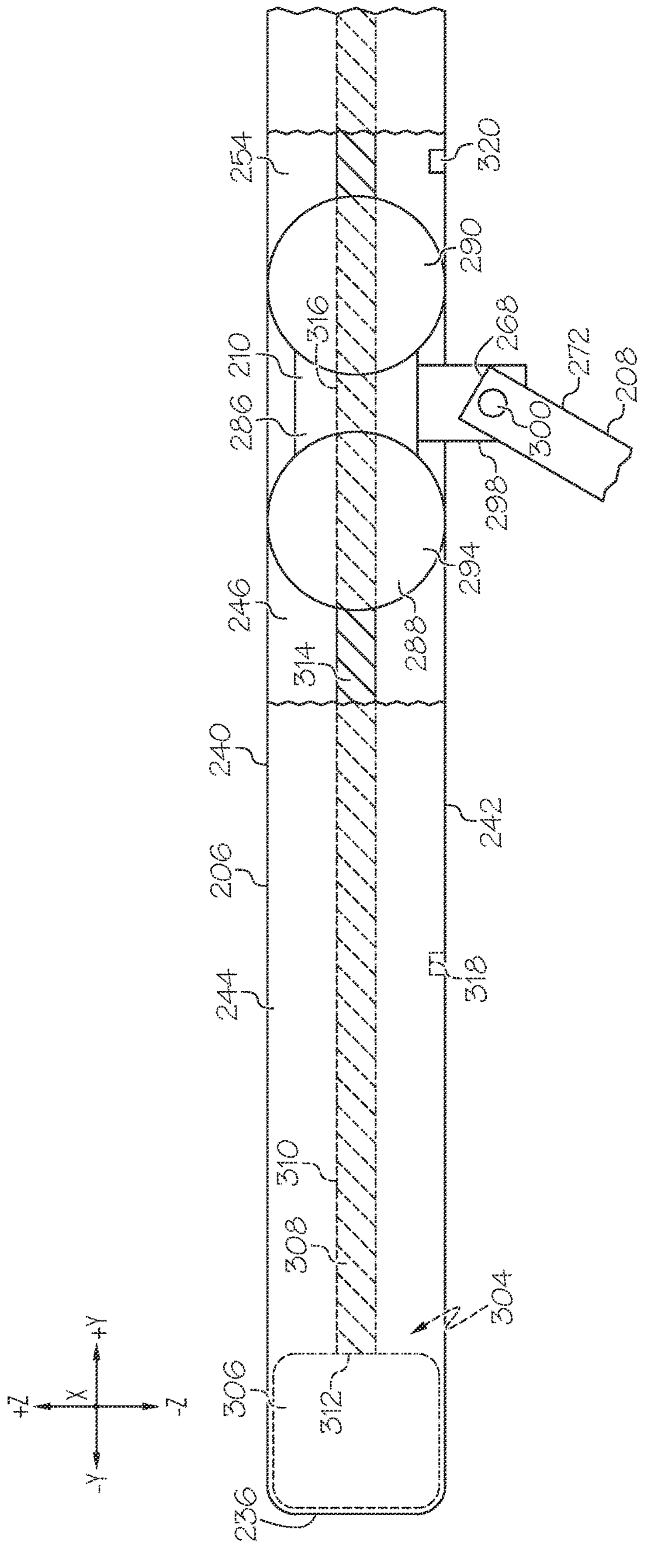
FIG. 11 depicts a partial cutaway side view of the lift arm including a carriage actuator according to one or more embodiments shown and described herein.

In embodiments, as shown in FIG. 11, a carriage actuator 304 may be provided for controlling movement of the carriage 210 along the length of the lift arm 206, i.e., in the +/−Y directions, within the cavity 254. The carriage actuator 304 may be at least partially disposed within the lift arm 206 and mechanically coupled to the carriage 210. The carriage actuator 304 includes a carriage motor 306 and a carriage actuator arm 308 coupled to the carriage motor 306. It will be understood that the carriage actuator 304 may have various other configurations and may include a worm gear, a linear gear, a hydraulic or pneumatic actuator comprising a mechanical pump or compressor, a linear actuator, or a similar type of actuator. In the embodiment illustrated in FIG. 11, the carriage actuator arm 308 is a shaft 310 extending through the cavity 254 and has a first end 312 engaging the carriage motor 306 and having external threads 314. It is to be understood that the length of the shaft 310 need only be as long as the desired range of motion of the carriage 210 in the +/−Y directions. In this embodiment, the body 286 of the carriage 210 has an internally threaded bore 316 for threadably engaging the shaft 310 which extends therethrough. When the carriage actuator 304 is provided, the fastener 264 and associated apertures 258, 260, 262, 302 in the carriage 210 and the lift arm 206 may not be necessary to lock the carriage 210 in position within the cavity 254 of the lift arm 206 since movement of the carriage 210 is prevented without activation of the carriage actuator 304. However, the fastener 264 and associated apertures 258, 260, 262, 302 may still be provided to provide additional locking.

In embodiments, the lifting device 200 further comprises a high range limit switch 318 and a low range limit switch 320 electronically coupled to the control unit 280 and provided in the cavity 254, as shown in FIGS. 9-11. The high range limit switch 318 may transmit an electrical signal to the control unit 280 of the lifting device 200 indicating that the carriage 210 is in a position in which the lift actuator 208 is in the high range position. Likewise, the low range limit switch 320 may transmit a signal to the control unit 280 of the lifting device 200 indicating that the carriage 210 is in a position in which the lift actuator 208 is in the low range position. It is to be understood that the distance between the limit switches 318, 320 is merely illustrative to show both of the limit switches 318, 320 within the cavity 254. However, the limit switches 318, 320 may be spaced further or closer apart to provide a higher or lower range of vertical motion for the carriage 210.

Referring again to FIGS. 8 and 12, the lifting device 200 comprises the control unit 280. The control unit 280 may comprise a battery 322 and may be electrically coupled to the lift actuator 208, the carriage actuator 304, the upper and lower limit switches 276, 278, and to the high and low range limit switches 318, 320, if provided. The control unit 280 may be operable to receive an input from an operator via a control device coupled to the control unit 280. The control device may comprise a wired controller and/or one or more wireless controllers. For example, in one embodiment, the control device may be a wired controller 324 or, alternatively, a controller integrated into the control unit 280. In another embodiment, the controller may be a wireless controller such as a wireless hand control 326. Based on the input received from the control device, the control unit 280 is programmed to adjust the position of the lift arm 206 and the carriage 210 by sending electric control signals to the lift actuator 208. Based on the input received from the control device, the control unit 280 is also programmed to move the lift actuator 208 to the high range position, the low range position, or at least one intermediate position by sending electronic control signals to the carriage actuator 304, if provided. Further, as will be described in more detail herein, the control unit 280 may also be incorporated into a lift control system 328 for the lifting device 200.

Figure 12:
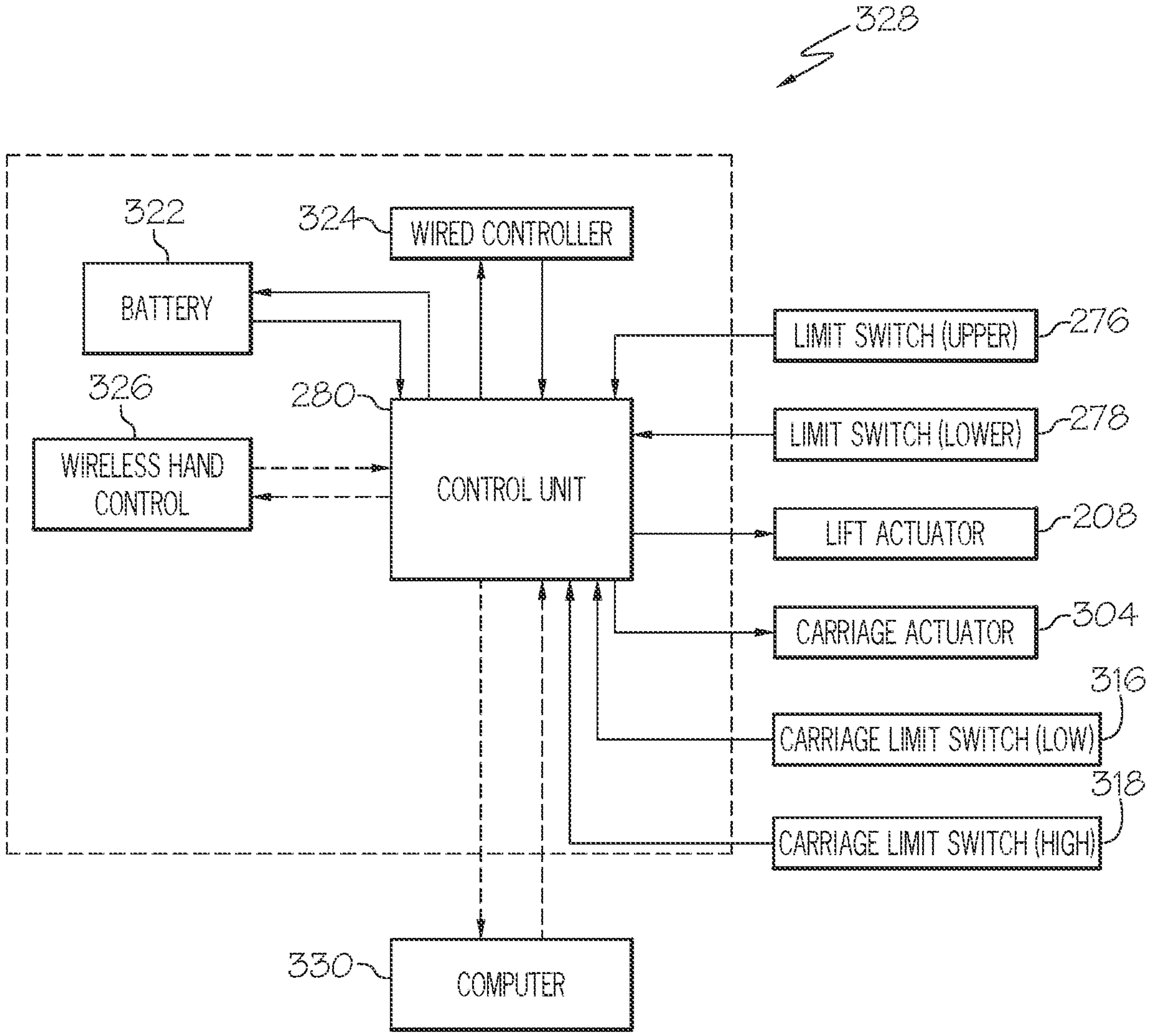
FIG. 12 schematically depicts a block diagram of a lift control system for use in conjunction with the lifting device of FIG. 8 according to one or more embodiments shown and described herein.

As shown in FIG. 12, a block diagram of a lift control system 328 for use in conjunction with the lifting device 200 shown in FIGS. 8-11 is schematically depicted according to one or more embodiments shown and described herein. The lift control system 328 may generally comprise the control unit 280, and a control device such as, for example, the wired controller 324 and/or a wireless controller, such as the wireless hand control 326. In one embodiment, the lift control system 328 may also include the battery 322.

The control unit may generally comprise a central processing unit ("CPU") and associated electrical components, including, without limitation, a processor (not shown) and at least one memory (not shown). The memory includes a set of computer readable and executable instructions, which the processor executes to control the lifting device 200.

The control unit 280 may further comprise at least one port for sending and/or receiving signals from other devices in the lift control system 328. For example, in one embodiment, the control unit 280 comprises at least one transceiver, such as an infrared (IR) transceiver or a radio frequency (RF) transceiver, which may be utilized by the control unit 280 to send data signals to other components in the lift control system 328. In the embodiments shown and described herein, the control unit 280 of the lift control system 328 comprises an IR transceiver, which is operable to send data signals to and receive data signals from the wireless hand control 326.

As described herein, the control unit 280 may be coupled to a control device such as the wired controller 324 and/or the wireless hand control 326. The wired controller 324 may be integral with the control unit 280 while, in other embodiments, the wired controller 324 may be coupled to the control unit 280 with a cable. In the embodiments shown and described herein, the wired controller 324 is integral with the control unit 280. The wireless hand control 326 includes an IR or RF transceiver such that the wireless hand control 326 is operable to send signals to and receive signals from the control unit 280. Each of the wired controller 324 and the wireless hand control 326 comprises user input controls located on the control device, which may be used to control the lifting device 200. The user input controls may include buttons which may be used to raise and lower the lift arm 206 of the lifting device 200.

As described herein, the control unit 280 may also comprise one or more ports for communicatively connecting the control unit to an external computer 330 or computer system to facilitate downloading data from the control unit 280, uploading data to the control unit 280, and/or reprogramming the control unit 280. For example, the control unit may comprise a USB port, an RS-port, an IR port or a similar port to facilitate directly coupling the control unit 280 to a computer or computer system.

In the embodiments where the control unit 280 comprises the battery 322, as depicted in FIG. 8, the control unit 280 also comprises circuitry to charge the battery 322 when the lifting device 200, specifically the lift control system 328 of the lifting device 200, is coupled to a voltage source (e.g., when the lift control system 328 is plugged in to a wall outlet or other source for supplying power to the lift control system 328).

Operation of the lifting device 200 will now be described in more detail with reference to FIGS. 8-12.

As shown in FIG. 8, the lift actuator 208 is illustrated as being in the high range position. In the high range position, the carriage 210 is positioned proximate an end of the cavity 254 closest to the first end 236 of the lift arm 206. The carriage 210 is locked in position either by inserting the fastener 264 through the lift arm 206 and the carriage 210, or by deactivating operation of the carriage actuator 304, if provided.

When it is desired to move the lift arm 206 within a lower range of vertical motion, for example, to lower a subject closer to the floor surface, and/or lower a subject at a slower speed, the lift actuator 208 is moved toward the low range position by moving the carriage 210 closer to an end of the cavity 254 closest to the second end 238 of the lift arm 206. To move the lift arm 206 toward the low range position, the carriage 210 is released from its locked position by removing the fastener 264, if provided. Thereafter, if the carriage actuator 304 is not provided, the carriage 210 is manually moved in the +Y direction along the length of the lift arm 206 to position the carriage 210 closer to the second end 238 of the lift arm 206. This will cause the lift actuator 208, specifically the lift actuator arm 272, to extend. As discussed herein, convention lift actuators permit free extension without being operated. Once the lift actuator 208 and the carriage 210 are in the desired position, the fastener 264 may be reinserted through the corresponding aperture 258, 260 formed in the lift arm 206 and the aperture 302 in the body 286 of the carriage 210.

In moving the lift arm 206 to the low range position, the lift actuator 208 may be initially extended and, thus, it may be desirable to move the lift arm 206 from the highest possible position, where the carriage 210 is in the high range position and the lift actuator 208 is fully extended, to the lowest possible position, where the carriage 210 is in the low range position and the lift actuator 208 is fully retracted. This allows the lift arm 206 to be moved from the highest possible position to the lowest possible position in the quickest manner. In doing so, the control unit 280 operates the lift actuator 208 to move from the fully extended position to the fully retracted position and the carriage 210 is manually moved to the low range position simultaneously.

The reverse operation can also be achieved in order to quickly move the lift arm 206 from the lowest possible position to the highest possible position. Specifically, the control unit 280 simultaneously operates the lift actuator 208 to move from the fully retracted position to the fully extended position and the carriage 210 is manually moved from the low range position to the high range position simultaneously.

Alternatively, the lift actuator 208 may be moved toward the low range position once the carriage 210 is unlocked from the lift arm 206 by operating the lift actuator 208. Activation of the lift actuator 208 from the retracted state to the extended state forces the carriage 210 to press against the upper wall 240 of the lift arm 206 and move through the cavity 254 toward the second end 238 of the lift arm 206.

However, when the lift arm 206 includes the carriage actuator 304, the carriage actuator 304 must be operated to move the lift actuator 208 toward the low range position. Otherwise, the carriage 210 will remain locked in position relative to the lift arm 206. Thus, in operating the carriage actuator 304, the control unit 280 activates the carriage motor 306 of the carriage actuator 304, which rotates the shaft 310 in a first direction. As discussed herein, the carriage 210 has a height and a width slightly less than the height and width of the cavity 254. Thus, the carriage 210 is not permitted to rotate with the shaft 310, but instead maintains its orientation within the cavity 254.

Operating the carriage actuator 304 alone will move the lift actuator 208 toward the low range position, but will also lower the lift arm 206. Therefore, if it is desired to move the lift actuator 208 toward the low range position while maintaining the lift arm 206 at the same height, the lift actuator 208 will also need to be operated. In doing so, the control unit 280 simultaneously activates both the carriage motor 306 of the carriage actuator 304 as well as the lift motor 270 of the lift actuator 208. This causes both the carriage actuator 304 and the lift actuator 208 to move the carriage 210 toward the second end 238 of the lift arm 206 and extend the lift actuator arm 272, respectively, to move the lift actuator 208 toward the low range position while maintaining the same height of the lift arm 206.

When it is desired to move the lift arm 206 within a higher range of vertical motion, for example, to raise a subject further from the base 202, and/or raise a subject at a higher speed, the lift actuator 208 is moved toward the high range position by moving the carriage 210 closer to the end of the cavity 254 closest to the first end 236 of the lift arm 206. To move the lift arm 206 toward the high range position, the carriage 210 is released from its locked position by removing the fastener 264, if provided. Thereafter, if the carriage actuator 304 is not provided, the carriage 210 is manually moved along the —Y direction of the lift arm 206. To position the carriage 210 closer to the second end 238 of the lift arm 206. Because the lift actuator 208 will not permit the lift actuator arm 272 to retract without the lift motor 270 being operated, the lift arm 206 will be raised. Once the lift actuator 208 and the carriage 210 are in the desired position, the fastener 264 may be reinserted through the corresponding aperture 258, 260, 262 formed in the lift arm 206 and the aperture 302 in the body 286 of the carriage 210.

Alternatively, the lift actuator 208 may be moved toward the low range position once the carriage 210 is unlocked from the lift arm 206 by operating the lift actuator 208. Activation of the lift actuator 208 from the extended state to the retracted state forces the carriage 210 to press against the lower wall 242 of the lift arm 206 and move through the cavity 254 toward the first end 236 of the lift arm 206.

However, when the lift arm 206 includes the carriage actuator 304, the carriage actuator 304 must be operated to move the lift actuator 208 toward the low range position. Otherwise, the carriage 210 will remain locked in position relative to the lift arm 206 and will only operate to raise and lower the lift arm 206. Thus, in operating the carriage actuator 304, the control unit 280 activates the carriage motor 306 of the carriage actuator 304, which rotates the shaft 310 in a second direction. As discussed herein, the carriage 210 has a height and a width slightly les s than the height and width of the cavity 254. Thus, the carriage 210 is not permitted to rotate with the shaft 310, but instead maintains its orientation within the cavity 254.

Operating the carriage actuator 304 alone will move the lift actuator 208 toward the low range position, but will also raise the lift arm 206. Therefore, if it is desired to move the lift actuator 208 toward the high range position while maintaining the lift arm 206 at the same height, the lift actuator 208 will also need to be operated. In doing so, the control unit 280 simultaneously activates both the carriage motor 306 of the carriage actuator 304 as well as the lift motor 270 of the lift actuator 208. This causes both the carriage actuator 304 and the lift actuator 208 to move the carriage 210 toward the first end 236 of the lift arm 206 and retract the lift actuator arm 272, respectively, to move the lift actuator 208 toward the high range position while maintaining the same height of the lift arm 206.

As described herein, to operate the lift actuator 208 in either the high range, the low range position, or any intermediate position, the control unit 280 is operable to utilize the computer readable and executable instructions and to output a control signal to the lift actuator 208 and the carriage actuator 304, if provided, based on input signals received from the wireless hand control 326 and/or the wired controller 324. When the lift actuator 208 is actuated with one of the control devices, the lift control system 328 outputs a control signal from the control unit 280 to the lift actuator 208 which actuates the lift actuator 208 thereby causing the lift arm 206 to be raised or lowered with respect to the base 202. Similarly, when the carriage actuator 304 is actuated with one of the control devices, the lift control system 328 outputs a control signal from the control unit 280 to the carriage actuator 304 that actuates the carriage actuator 304 thereby causing the carriage 210 to be moved forward or back within the cavity 254 of the lift arm 206. As discussed herein, it may be desired or necessary to operate both the lift actuator 208 and the carriage actuator 304 simultaneously to maintain the lift arm 206 at the same height. Thus, it is understood that the control devices may be provided with controls for simultaneously operating both the lift actuator 208 and the carriage actuator 304 at the same speed instead of requiring the operator to operate controls of both the lift actuator 208 and the carriage actuator 304.

It may be necessary to operate both the lift actuator 208 and the carriage actuator 304 simultaneously in the manner discussed above when it is desired to move the lift arm 206 from the lowest possible position, such as when the lift actuator 208 is fully retracted and in low range position, to the highest possible position, such as when the lift actuator 208 is fully extended and in the high range position. Simultaneously operating the lift actuator 208 and the carriage actuator 304 allows for the lift arm 206 to move from the lowest position to the highest position in the quickest manner. This avoids separately transitioning the carriage actuator 304 from the low range position to the high range position and, subsequently, operating the lift actuator 208 from the fully retracted position to the fully extended position.

The reverse operation can also be achieved in order to quickly move the lift arm 206 from the highest possible position to the low possible position. Specifically, the control unit 280 simultaneously operates the carriage actuator 304 to move from the high range position to the low range position and operates the lift actuator 208 to move from the fully extended position to the fully retracted position.

It should be appreciated that moving the lift actuator 208 from the high range position toward the low range position allows the lift arm 206 to be lowered to a reduced height and moved at a reduced speed without modifying the structure of the lift actuator 208 itself. This is because the second end 268 of the lift actuator 208 is coupled to the lift arm 206 at a greater distance in the low range position than in the high range position.

Moreover, while the lifting devices illustrated herein is depicted as a mobile patient lift, it should be understood that the mobile lift systems described herein may be used in conjunction with other lifting devices having various other configurations including, without limitation, stationary lifting devices and overhead lifting devices. Further, it should also be understood that, while specific embodiments of the lifting device described herein relate to lifting devices used for raising and/or lowering subjects, the lift control systems described herein may be used with any lifting device, which is operable to raise and lower a load.

Throughout the specification, the term "coupled" implies that the elements may be directly connected together or may be coupled through one or more intervening elements.

From the above, it is to be appreciated that defined herein is a new and unique lifting device including an actuator selectively positionable in a high position relative to a lift arm and a low position relative to a lift arm to provide a higher range of vertical motion of the lift arm and adjust the speed at which the lift arm raises and lowers.

Further aspects of the embodiments described herein are provided by the subject matter of the following clauses:

Clause 1. A lifting device comprising: a lift mast; a lift arm pivotally coupled to the lift mast; a lift actuator having a first end and a second end, the first end of the lift actuator pivotally coupled to the lift mast; and a linkage member having a first end and a second end, the first end of the linkage member pivotally coupled to the lift arm and the second end of the linkage member pivotally coupled to the second end of the lift actuator such that the lift actuator is positionable between a high range position relative to the lift arm and a low range position relative to the lift arm, wherein the lift actuator is selectively positionable in the high range position and the low range position.

Clause 2. The lifting device of clause 1, further comprising a pair of spaced apart stabilizers extending from the lift arm for preventing lateral separation of the linkage member from the lift arm.

Clause 3. The lifting device of clause 1 or clause 2, wherein each stabilizer comprises a pair of side walls extending perpendicular to a lower wall of the lift arm, the pair of side walls defining a channel for receiving the linkage member.

Clause 4. The lifting device of any of clauses 1-3, wherein, when the lift actuator is in the high range position, a first surface of the linkage member faces a lower surface of the lift arm and wherein, when the lift actuator is in the low range position, an opposite second surface of the linkage member faces the lower surface of the lift arm.

Clause 5. The lifting device of any of clauses 1-4, further comprising a pair of spaced apart retaining members for preventing lateral and longitudinal separation of the linkage member from the lift arm, each retaining member having a first end and a second end, at least one of the first end and the second end being removably attachable to the linkage member.

Clause 6. The lifting device of any of clauses 1-5, wherein each retaining member is a strap having a first end and second end, the first end of each strap removably attached to a first side of the lift arm and the second end of each strap removably attached to a second side of the lift arm.

Clause 7. The lifting device of any of clauses 1-6, further comprising a linkage bracket extending from a lower wall of the lift arm, the second end of the linkage member pivotally connected to the linkage bracket.

Clause 8. The lifting device of any of clauses 1-7, wherein the high range position is defined by a first height relative to a base of the lifting device and a second height relative to the base of the lifting device, and the low range position is defined by a third height relative to the base of the lifting device and a fourth height relative to the base of the lifting device, wherein the first height is greater than the third height and the second height being greater than the fourth height.

Clause 9. A lifting device comprising: a lift mast; a lift arm pivotally coupled to the lift mast, the lift arm comprising a cavity extending at least partially along a length of the lift arm; a lift actuator having a first end and a second end, the first end of the lift actuator pivotally coupled to the lift mast; and a carriage at least partially disposed within the cavity, the second end of the lift actuator pivotally coupled to the carriage, wherein the carriage is movable within the cavity in a direction of the length of the lift arm and selectively positionable at at least two points along the cavity.

Clause 10. The lifting device of clause 9, wherein the carriage includes a body and at least one wheel rotatably attached to the body.

Clause 11. The lifting device of clause 9 or clause 10, wherein the at least one wheel comprises a pair of front wheels rotatably attached to the body and a pair of rear wheels rotatably attached to the body.

Clause 12. The lifting device of any of clauses 9-11, wherein the lift arm has an upper wall, a lower wall, and a pair of side walls, which define the cavity.

Clause 13. The lifting device of any of clauses 9-12, wherein a channel is formed in the lower wall of the lift arm, the carriage including a finger extending through the channel, the second end of the lift actuator pivotally connected to the finger.

Clause 14. The lifting device of any of clauses 9-13, wherein the lift arm includes at least a pair of apertures formed in a side wall of the lift arm and a fastener selectively positionable within each of the pair of apertures for engaging the carriage and locking the carriage in either a high range position or a low range position within the cavity.

Clause 15. The lifting device of any of clauses 9-14, further comprising a carriage actuator, the carriage actuator comprising a carriage motor and a shaft, the shaft extending through and threadably engaging the carriage, wherein activation of the carriage motor in a first operation rotates the shaft in a first direction and moves the carriage toward the second end of the lift arm and activation of the carriage motor in a second operation rotates the shaft in a second direction and moves the carriage toward the first end of the lift arm.

Clause 16. The lifting device of any of clauses 9-15, further comprising a high range limit switch, a low range limit switch, and a control unit electronically coupled to the high range limit switch and the low range limit switch, the control unit comprising a control device configured to simultaneously send electronic control signals to the lift actuator and the carriage actuator in order to move the lift actuator between a high range position and a low range position, the high range limit switch sending an electrical signal to the control unit when the carriage is in the high range position and the low range limit switch sending an electrical signal to the control unit when the carriage is in the low range position.

Clause 17. A lift arm assembly for a lifting device including a lift mast and a lift actuator, the lift arm assembly comprising: a lift arm pivotally coupled to the lift mast; and a linkage member having a first end and a second end, the first end of the linkage member pivotally coupled to the lift arm, the second end of the linkage member pivotally connectable to the lift actuator such that the lift actuator can be selectively positioned in a high range position relative to the lift arm and a low range position relative to the lift arm.

Clause 18. The lift arm assembly of clause 17, further comprising a pair of spaced apart stabilizers extending from the lift arm for preventing lateral separation of the linkage member from the lift arm, each stabilizer comprising a pair of side walls extending perpendicular to a lower wall of the lift arm, the pair of side walls defining a channel for receiving the linkage member.

Clause 19. The lift arm assembly of clause 17 or clause 18, wherein, when the lift actuator is in the high range position, a first surface of the linkage member faces a lower surface of the lift arm and wherein, when the lift actuator is in the low range position, an opposite second surface of the linkage member faces the lower surface of the lift arm.

Clause 20. The lift arm assembly of any of clauses 17-19, wherein the high range position is defined by a first height relative to a base of the lifting device and a second height relative to the base of the lifting device, and the low range position is defined by a third height relative to the base of the lifting device and a fourth height relative to the base of the lifting device, the first height being greater than the third height and the second height being greater than the fourth height.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lifting device comprising:

a lift mast;

a lift arm pivotally coupled to the lift mast, the lift arm having a first end and a second end opposite the first end;

a lift actuator having a first end and a second end, the first end of the lift actuator pivotally coupled to the lift mast;

a linkage member having a first end and a second end, the first end of the linkage member pivotally coupled to the lift arm and the second end of the linkage member pivotally coupled to the second end of the lift actuator such that the lift actuator is positionable between a high range position relative to the lift arm and a low range position relative to the lift arm; and a pair of spaced apart stabilizers extending from the lift arm for preventing lateral separation of the linkage member from the lift arm, a first stabilizer of the pair of spaced apart stabilizers located a first distance from the first end of the lift arm, a second stabilizer of the pair of spaced apart stabilizers located a second distance from the first end of the lift arm greater than the first distance, wherein the lift actuator is selectively positionable in the high range position and the low range position.

2. The lifting device of claim 1, wherein each stabilizer comprises a pair of side walls extending perpendicular to a lower wall of the lift arm, the pair of side walls defining a channel for receiving the linkage member.

3. The lifting device of claim 2, wherein, when the lift actuator is in the high range position, a first surface of the linkage member faces a lower wall of the lift arm and wherein, when the lift actuator is in the low range position, an opposite second surface of the linkage member faces the lower wall of the lift arm.

4. The lifting device of claim 1, further comprising a pair of spaced apart retaining members for preventing lateral and longitudinal separation of the linkage member from the lift arm, each retaining member having a first end and a second end, at least one of the first end and the second end being removably attachable to the linkage member.

5. The lifting device of claim 4, wherein each retaining member is a strap having a first end and second end, the first end of each strap removably attached to a first side of the lift arm and the second end of each strap removably attached to a second side of the lift arm.

6. The lifting device of claim 1 further comprising a linkage bracket extending from a lower wall of the lift arm, the second end of the linkage member pivotally connected to the linkage bracket.

7. The lifting device of claim 1, wherein the high range position is defined by a first height relative to a base of the lifting device and a second height relative to the base of the lifting device, and the low range position is defined by a third height relative to the base of the lifting device and a fourth height relative to the base of the lifting device, wherein the first height is greater than the third height and the second height being greater than the fourth height.

8. A lift arm assembly for a lifting device including a lift mast and a lift actuator, the lift arm assembly comprising:

a lift arm pivotally coupled to the lift mast, the lift arm having a first end and a second end opposite the first end;

a linkage member having a first end and a second end, the first end of the linkage member pivotally coupled to the lift arm, the second end of the linkage member pivotally connectable to the lift actuator such that the lift actuator can be selectively positioned in a high range position relative to the lift arm and a low range position relative to the lift arm; and a pair of spaced apart stabilizers extending from the lift arm for preventing longitudinal separation of the linkage member from the lift arm, a first stabilizer of the pair of spaced apart stabilizers located a first distance from the first end of the lift arm, a second stabilizer of the pair of spaced apart stabilizers located a second distance from the first end of the lift arm greater than the first distance.

9. The lift arm assembly of claim 8, wherein each stabilizer comprises a pair of side walls extending perpendicular to a lower wall of the lift arm, the pair of side walls defining a channel for receiving the linkage member.

10. The lift arm assembly of claim 9, wherein, when the lift actuator is in the high range position, a first surface of the linkage member faces a lower wall of the lift arm and wherein, when the lift actuator is in the low range position, an opposite second surface of the linkage member faces the lower wall of the lift arm.

11. The lift arm assembly of claim 8, wherein the high range position is defined by a first height relative to a base of the lifting device and a second height relative to the base of the lifting device, and the low range position is defined by a third height relative to the base of the lifting device and a fourth height relative to the base of the lifting device, the first height being greater than the third height and the second height being greater than the fourth height.

12. A method comprising:

positioning a lift actuator of a lifting device between a high range position and a low range position, the lifting device comprising:

a lift mast;

a lift arm pivotally coupled to the lift mast, the lift arm having a first end and a second end opposite the first end;

the lift actuator having a first end and a second end, the first end of the lift actuator pivotally coupled to the lift mast;

a linkage member having a first end and a second end, the first end of the linkage member pivotally coupled to the lift arm and the second end of the linkage member pivotally coupled to the second end of the lift actuator; and a pair of spaced apart stabilizers extending from the lift arm for preventing lateral separation of the linkage member from the lift arm, a first stabilizer of the pair of spaced apart stabilizers located a first distance from the first end of the lift arm, a second stabilizer of the pair of spaced apart stabilizers located a second distance from the first end of the lift arm greater than the first distance, wherein in the high range position, the linkage member is in a first position, wherein in the low range position, the linkage member is in a second position.

13. The method of claim 12, wherein in the first position, a first surface of the linkage member faces a lower wall of the lift arm and wherein in the second position, a second surface of the linkage member opposite the first surface faces the lower wall of the lift arm.

14. The method of claim 13, wherein each stabilizer comprises a pair of side walls extending perpendicular to the lower wall of the lift arm, the pair of side walls defining a channel for receiving the linkage member.

15. The method of claim 12, wherein a pair of spaced apart retaining members prevent lateral and longitudinal separation of the linkage member from the lift arm, each retaining member having a first end and a second end, at least one of the first end and the second end being removably attachable to the linkage member.

16. The method of claim 15, wherein each retaining member is a strap having a first end and second end, the first end of each strap removably attached to a first side of the lift arm and the second end of each strap removably attached to a second side of the lift arm.

17. The method of claim 13, further comprising a linkage bracket extending from the lower wall of the lift arm, the second end of the linkage member pivotally connected to the linkage bracket.

18. The method of claim 12, wherein the high range position is defined by a first height relative to a base of the lifting device and a second height relative to the base of the lifting device, and the low range position is defined by a third height relative to the base of the lifting device and a fourth height relative to the base of the lifting device, wherein the first height is greater than the third height and the second height being greater than the fourth height.

* * * * *